US010229059B2

(12) United States Patent
Mandal et al.

(10) Patent No.: US 10,229,059 B2
(45) Date of Patent: Mar. 12, 2019

(54) DYNAMIC FILL POLICY FOR A SHARED CACHE

(71) Applicant: Intel Corporation, Santa Clara, CA (US)

(72) Inventors: Ayan Mandal, Karnataka (IN); Eran Shifer, Tel Aviv (IL); Leon Polishuk, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/476,816

(22) Filed: Mar. 31, 2017

(65) Prior Publication Data

US 2018/0285261 A1    Oct. 4, 2018

(51) Int. Cl.
| | | |
|---|---|---|
| *G06F 12/08* | (2016.01) | |
| *G06F 12/084* | (2016.01) | |
| *G06F 12/0846* | (2016.01) | |
| *G06F 12/0855* | (2016.01) | |
| *G06F 9/50* | (2006.01) | |
| *G06F 12/02* | (2006.01) | |
| *G06F 12/0888* | (2016.01) | |
| *G06F 12/1027* | (2016.01) | |

(Continued)

(52) U.S. Cl.
CPC .......... *G06F 12/084* (2013.01); *G06F 3/0653* (2013.01); *G06F 9/5016* (2013.01); *G06F 12/0223* (2013.01); *G06F 12/0846* (2013.01); *G06F 12/0855* (2013.01); *G06F 12/0888* (2013.01); *G06F 12/1027* (2013.01); *G06F 2009/45583* (2013.01); *G06F 2212/1028* (2013.01); *G06F 2212/1044* (2013.01); *G06F 2212/604* (2013.01); *G06F 2212/6046* (2013.01)

(58) Field of Classification Search
CPC ............ G06F 12/0804; G06F 12/0815; G06F 12/0808; G06F 12/0873
USPC .......................................................... 711/130
See application file for complete search history.

(56) References Cited

U.S. PATENT DOCUMENTS

2013/0326164 A1    12/2013    Jeddeloh
2014/0189065 A1*   7/2014     van der Schaar ....... H04L 67/32
                                                      709/219
2018/0004668 A1*   1/2018     Azizi .................. G06F 12/0848

OTHER PUBLICATIONS

"PL310 Cache Controller Technical Reference Manual", copyright 2007 ARM Limited, 148 pages, retrieved on Mar. 25, 2017 from http://infocenter.arm.com/help/topic/com.arm.doc.ddi0246a/DDI0246A_l2cc_pl310_r0p0_trm.pdf.

(Continued)

*Primary Examiner* — Than Nguyen
(74) *Attorney, Agent, or Firm* — Alliance IP, LLC

(57) ABSTRACT

Technologies are provided in embodiments to dynamically fill a shared cache. At least some embodiments include determining that data requested in a first request for the data by a first processing device is not stored in a cache shared by the first processing device and a second processing device, where a dynamic fill policy is applicable to the first request. Embodiments further include determining to deallocate, based at least in part on a threshold, an entry in a buffer, the entry containing information corresponding to the first request for the data. Embodiments also include sending a second request for the data to a system memory, and sending the data from the system memory to the first processing device. In more specific embodiments, the data from the system memory is not written to the cache based, at least in part, on the determination to deallocate the entry.

25 Claims, 13 Drawing Sheets

(51) Int. Cl.
  *G06F 3/06* (2006.01)
  *G06F 9/455* (2018.01)

(56) References Cited

OTHER PUBLICATIONS

Arora, Manish, "The Architecture and Evolution of CPU-GPU Systems for General Purpose Computing", pp. 1-12, retrieved on Feb. 21, 2017 from http://cseweb.ucsd.edu/~marora/files/papers/REReport_ManishArora.pdf.

Kayiran, Onur et al., "Managing GPU Concurrency in Heterogeneous Architectures", pp. 1-13, retrieved on Feb. 21, 2017 from https://users.ece.cmu.edu/~omutlu/pub/gpu-concurrency-management_micro14.pdf.

Mittal, Sparsh, "A Survey of Cache Bypassing Techniques," Journal of Low Power Electronics and Applications, Apr. 28, 2016, (30 pages), retrieved on Mar. 5, 2017 from file:///C:/Users/admin/Downloads/jlpea-06-00005%20(1).pdf.

\* cited by examiner

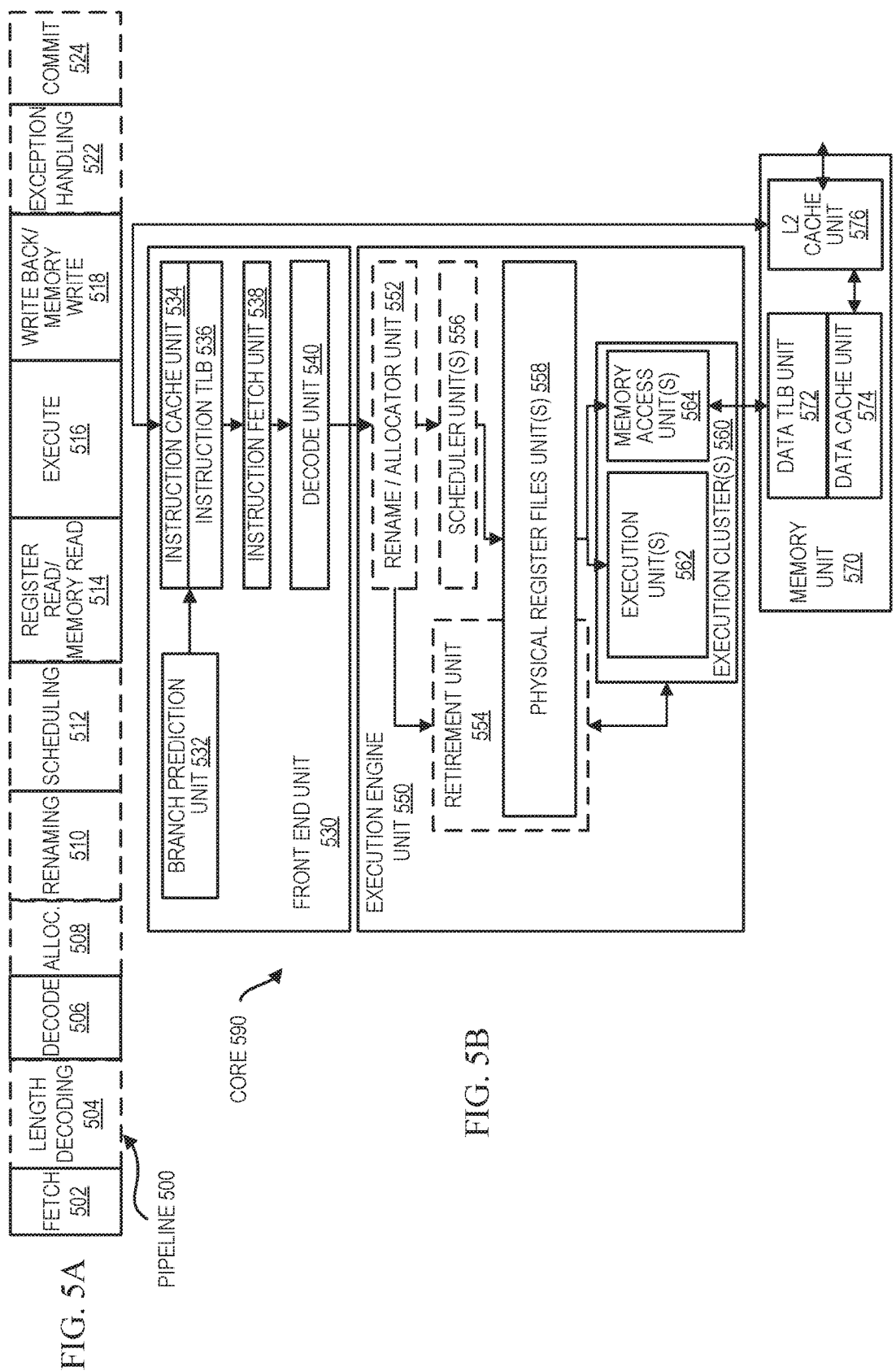

DYNAMIC FILL POLICY FOR A SHARED CACHE

TECHNICAL FIELD

This disclosure relates in general to the field of computing architectures, and more particularly, to a dynamic fill policy for a shared cache in a computing architecture.

BACKGROUND

Computing architectures that integrate multiple diverse on-chip processing devices are becoming a dominant computing platform for many types of applications. A system that integrates more than one type of processor or core generally also includes certain memory that is shared between the processors or cores. For example, a last level cache (LLC) may be shared between multiple on-chip processing devices such as a central processing unit (CPU) and a graphics processing unit (GPU). An LLC is a critical resource because it can impact system performance. Designing a system with multiple diverse on-chip processing devices sharing a memory resource, however, can be complex due to conflicting requirements of the devices. For example, a common requirement in computing platforms to maximize resource utilization may be difficult to achieve when trying to minimize shared resource conflicts between a CPU and GPU. Thus, computer architectures that integrate multiple diverse on-chip processing devices could benefit from new solutions that manage conflicting requirements and characteristics of diverse on-chip processing devices.

BRIEF DESCRIPTION OF THE DRAWING

To provide a more complete understanding of the present disclosure and features and advantages thereof, reference is made to the following description, taken in conjunction with the accompanying figures, where like reference numerals represent like parts, in which:

FIG. 5A is a block diagram illustrating both an exemplary in-order pipeline and an exemplary register renaming, out-of-order issue/execution pipeline according to an embodiment;

FIG. 5B is a block diagram illustrating both an exemplary embodiment of an in-order architecture core and an exemplary register renaming, out-of-order issue/execution architecture core to be included in a processor according to an embodiment;

DETAILED DESCRIPTION OF EMBODIMENTS

Figure 1:
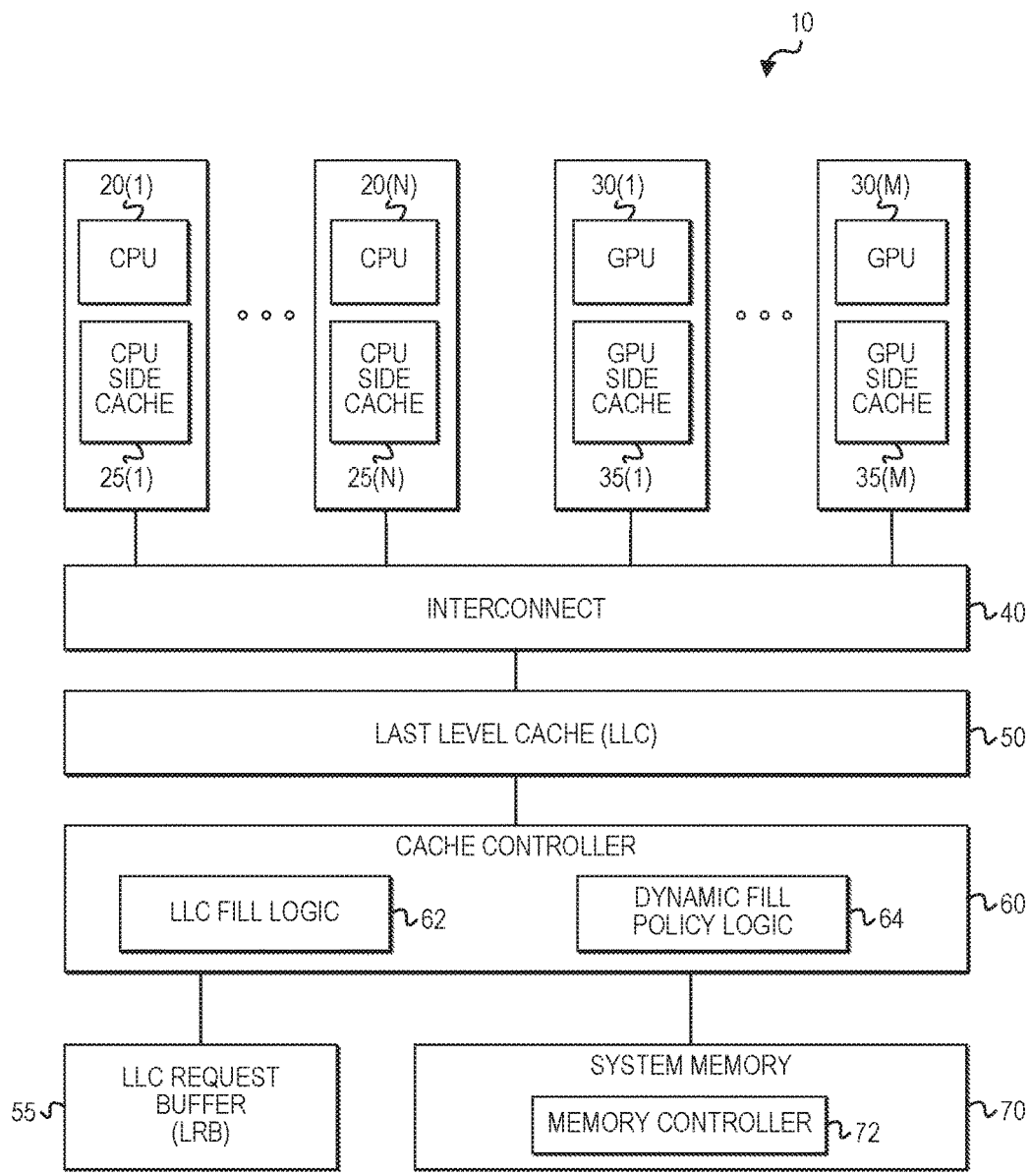
FIG. 1 is a simplified block diagram of an example computing system for dynamically filling a last level cache according to an embodiment of the present disclosure.

The following disclosure provides various possible embodiments, or examples, for implementing features disclosed in this specification. These features are related to a computing system in which a dynamic fill policy (DFP) is used to manage a shared cache. A dynamic fill policy includes logic that is invoked when requests for data from certain processing devices in a multi-processor architecture are received. The logic is to dynamically determine whether to fill in a shared cache with data from system memory to satisfy future requests for the data, or instead, to bypass the shared cache and provide the data from the system memory directly to the requesting processing device. In an example, a dynamic fill policy may be used in an architecture in which one processing device has a different shared cache sensitivity related to data latency and/or bandwidth than at least one other processing device in the same architecture.

In at least one embodiment, a determination of whether to fill in a shared cache with data from system memory or to bypass the shared cache can be based on a threshold associated with a lower level cache buffer (LRB), which holds outstanding requests for data. The threshold can be used as a basis for determining whether the LRB is too full, in which case the LRB entry that corresponds to the relevant request for data can be deallocated and the shared cache is bypassed and therefore not filled with the data that satisfies that request. Rather, the requested data may be provided directly to the requesting processing device from system memory.

For purposes of illustrating certain example techniques of a computing system for dynamically filling a last level cache, it is important to understand the activities that may be occurring in such systems with multiple diverse on-chip processing devices. The following foundational information may be viewed as a basis from which the present disclosure may be properly explained.

In typical computer architectures, different types of memory can be used to store data that is accessed by a processor. System memory (also referred to as 'main memory') includes a memory element that typically holds current programs and data that are being used by a processor. Dynamic random access memory (DRAM) is often used for system memory in modern computer architectures due to its speed and low cost. A cache is a memory element that may be used to store data from other memory so that future requests for that data can be served more quickly. The other memory can include, for example, memory-mapped input/output devices (MMIO), hard disks, a basic input/output system (BIOS) read only memory (ROM), and/or random access memory (e.g., DRAM, static RAM, etc.). Some caches, such as level 1 (L1) and level 2 (L2) caches can be described as processor side caches, which are provisioned on or close to a processor. Other caches may be referred to as memory side caches, which are provisioned closer to main memory. For example, one or more processor side caches are typically provisioned for each CPU (e.g., L1 cache, L2 cache, etc.) and each GPU (e.g., texture cache, L2 cache, etc.). A memory side cache, also referred to as 'last level cache' or 'LLC', is also typically provisioned in a computing architecture near the system memory and typically holds more data than the processor side caches.

In computing architectures involving multiple on-chip processing devices (e.g., CPUs, GPUs, etc.), certain resources can be shared. For example, a last level cache (LLC) and cache controller are elements that can be shared by cores of the same processor and by diverse on-chip processing devices, such as CPUs and GPUs. The combination of diverse processing devices in a single computing system, however, can make it difficult to maximize resource utilization while minimizing shared resource conflicts. For example, CPUs usually have fewer parallel threads executing, can have comparatively higher hit rates in an LLC, and can be very sensitive to data access latency. Application memory footprints of CPU workloads typically have good spatial and temporal locality. Temporal locality refers to the likelihood that data that is referenced at a point in time will be referenced again in the near future. Spatial locality refers to the likelihood that referencing particular data is higher if other data with a nearby address was recently referenced. Because applications that run on CPUs tend to reuse data and thus, tend to have good spatial and temporal locality, a last level cache can become a primary provider to those CPUs of data with low latency and high bandwidth. Accordingly, a cache controller for the LLC is typically optimized to provide a very low access latency for CPUs even in a loaded scenario, where the lower level cache is full or nearly full. Hence, when hit rates are high, the cache controller can operate at a very high frequency and can be banked (e.g., divided into instruction cache and data cache) in order to increase the throughput. Conversely, the cache controller can be inefficient when miss rates go high.

In contrast to CPU workloads, application memory footprints of many GPU workloads are large. GPUs usually have a large number of parallel independent threads and comparatively lower hit rates in a last level cache. Thus, GPUs tend to monopolize shared hardware resources such as system memory. Furthermore, GPUs are generally less sensitive to data access latency and are more sensitive to the overall bandwidth delivered. Consequently, GPU workloads with poor hit rates (also referred to as 'high miss rates') in the LLC can cause the cache controller to operate very inefficiently both in terms of power and performance. The extra dynamic power is wasted because new requests continue to access the cache controller every cycle, only to find that it does not have enough resources to make forward progress. The performance degrades since the LLC request buffer is not sufficiently sized to hold enough outstanding read requests (or indications of the outstanding read requests) to cover the system memory latency.

Due to the characteristics of CPUs and GPUs, CPU workloads need to be optimized more for latency and high LLC hit rates, while GPU workloads need to be optimized for overall bandwidth delivery and low LLC hit rates. These conflicting requirements can make it difficult to optimize a cache controller for a shared cache. With multiple parallel threads from a GPU, a system memory scheduler (e.g., DRAM scheduler), which may be part of a memory controller, needs a large number of outstanding requests from the GPU in order to exploit locality and hence optimize bandwidth. Requests are considered to have locality when they are located in the same memory page (e.g., a DRAM page). A greater number of read requests is indicative of greater locality (i.e., a greater number of requests located in the same memory page), and greater locality enables the system memory to optimize bandwidth.

When a request is made from a processing device (e.g., a CPU, a GPU), the LLC may be searched for data to fill the request. This search is also referred to herein as a 'lookup'. If there is a hit (i.e., requested data is found in the LLC) during a lookup of the LLC, then the data found in the LLC can be used to fulfill the request to the requesting device without having to access system memory. If there is not a hit (i.e., requested data is not found in the LLC) during the LLC lookup, then the request is considered outstanding and system memory can be accessed to obtain the requested data. If system memory is accessed, the requested data is written to the LLC and then provided to the requesting device. When requests are filled from system memory to the LLC, an LLC request buffer (LRB) tracks these outstanding requests to the system memory. Hence, the size of the LRB defines the fabric depth throughput and the extent of look-ahead achieved by the request streams at system memory. Consequently, the LRB becomes the limiter in bandwidth delivery.

Current approaches to maximize resource utilization by diverse on-chip processing devices having conflicting requirements have not been adequate. For example, choosing not to fill the LLC when a GPU request misses during an LLC lookup so that the LRB does not cover the system memory latency, can still negatively impact the performance of some GPU workloads. Specifically, while caching only CPU requests and not GPU requests may improve the performance of GPU workloads having poor hit rates in an LLC, the performance of GPU workloads having low memory footprints with comparatively higher hit rates in the LLC can suffer. In another scenario, adding a high bandwidth memory side cache for the GPU requests can result in a high cost of area and power and is not feasible for all power envelopes. In yet another scenario, increasing the size of the LRB can necessitate higher silicon area and higher power. Thus, the results can include limiting the operating frequency, increasing the hardware cost, and contributing to higher static and dynamic power. In addition, increasing the LRB can potentially lead to reduced frequency or higher latency of operation. Thus, an approach is needed to intelligently utilize and optimize shared resources, such as an LLC, by diverse on-chip processing devices having conflicting requirements and characteristics.

Embodiments disclosed herein can resolve the aforementioned issues (and more) associated with computing systems that include diverse on-chip processing devices that utilize shared resources and have conflicting requirements. An embodiment of computing system 10 implements a dynamic fill policy to dynamically determine whether to fill a last level cache for processing device read requests based on bandwidth demand. In at least one embodiment, the dynamic fill policy can be applicable to requests for data from processing devices that may have low hit rates, such as GPUs, but not applicable to requests for data from processing devices with typically high hit rates, such as CPUs. For a read request to which the dynamic fill policy is applicable, a cache controller dynamically decides whether to fill in the cache with data from system memory based on current hit rates in the cache. The current hit rates can be inferred based on a comparison of the amount of outstanding (i.e., filled) or remaining (i.e., free) entries in the LLC request buffer (LRB) relative to an appropriate threshold. Since an LRB does not track requests that do not fill in the LLC, dynamically determining whether to fill a last level cache based on the LRB allows for more outstanding requests at the system memory (e.g., DRAM), thus enabling the system memory to optimize bandwidth delivery.

More specifically, when the dynamic fill policy is applicable to a request for data from a processing device (also referred to herein as a 'DFP processing device') and the LRB becomes too full or is 'in pressure' (e.g., near its maximum capacity), requests from the processing device do not cause the LLC to be filled in with data to serve the requests. In at least some embodiments, when a read request is received from a DFP processing device and the LRB is too full, a determination is made, based at least in part on a threshold, to deallocate an entry in the LRB that corresponds to the read request. The threshold may be predetermined and selected based on a fill limit that indicates the LRB is unable to proceed with new requests. In at least some embodiments, the fill limit is an amount that is near, but not equal to a maximum capacity of the LRB. In addition, in at least some embodiments, requests from DFP processing devices do not fill in the LLC only when the LRB is too full (e.g., reaches near its maximum capacity) and is not able to proceed with new requests. Furthermore, alternative techniques may be used to determine whether to deallocate a relevant entry in the LRB and will be further described herein.

For workloads of DFP processing devices that have good hit rates in LLC, the LRB does not reach the fill limit often, since the residency time of hit requests in LRB is low. Consequently, the dynamic fill policy is not invoked for such workloads. For workloads of DFP processing devices that have poor hit rates in LLC, however, long residency pressure can build in the LRB as it gets drained only at the system memory bandwidth. In embodiments disclosed herein, this can trigger the dynamic fill policy logic to cause a read request to not fill in the LLC and to deallocate the entry in the LRB for that request, thus relieving pressure on the LRB. Hence, when the dynamic fill policy is invoked, outstanding requests at system memory increase and enable the system memory scheduler to optimize system memory bandwidth by exploiting locality. Invoking the dynamic fill policy can also reduce fabric queues cross interference between requests that do not have high LLC hit rates (e.g., from GPUs) and requests that have high LLC hit rates (e.g., from CPUs).

Computing system 10 implementing a dynamic fill policy provides several advantages. Embodiments herein contribute to overall higher bandwidth delivery at a cost of reduced LLC hit rates. Embodiments described herein can also improve the power and performance of a cache controller for high bandwidth and low LLC hit rate device workloads (e.g., GPU workloads) while not impairing the performance for high LLC hit rate device workloads (e.g., CPU workloads). For embodiments in which a dynamic fill policy is applied to one or more graphics processing units, the last layer cache and memory efficiency can be improved and, through that, contribute to higher graphics performance. Embodiments of computing system 10 can also enable software to extract the maximum benefit from an LLC by providing intelligent information regarding LLC re-use.

Turning to FIG. 1, FIG. 1 is a simplified block diagram of an example computing system 10, which implements a dynamic fill policy for dynamically filling a last level cache 50 in computing system 10. Computing system 10 includes at least two types of processing devices. For ease of discussion, FIG. 1 depicts one or more central processing units (CPUs) 20(1)-20(N) and one or more graphics processing units (GPUs) 30(1)-30(M) provisioned in computing system 10. It should be apparent to those skilled in the art, however, that other types of processing devices with a shared cache may benefit from the application of a dynamic fill policy as further described herein with reference to CPUs 20(1)-20(N) and GPUs 30(1)-30(M). Processor side CPU caches 25(1)-25(N) may be coupled respectively to CPUs 20(1)-20(N). Processor side GPU caches 35(1)-35(M) may be coupled respectively to GPUs 30(1)-30(M). An on-chip interconnect 40 may be coupled to components of computing system 10 and provide on-chip communication between components. A last level cache (LLC) 50 may be shared by the CPUs and GPUs. A cache controller 60 can comprise dynamic fill policy logic 64 that enables dynamically filling LLC 50 based on the capacity of an LLC request buffer (LRB) 55 and whether a dynamic fill policy is applicable to a request for data from a processing device. Cache controller 60 may be coupled to LLC 50 and to LLC request buffer 55. Cache controller 60 can also be coupled to a system memory 70 by a memory controller 72. Cache controller 60 can send requests for data to system memory 70 via memory controller 72 when such requests (e.g., read requests) from processing devices cannot be satisfied by LLC 50.

A brief discussion is now provided about some of the possible infrastructure that may be included in computing system 10. Computing system 10 includes at least two types of processing devices (also referred to herein as 'processors'), such as CPUs and GPUs in the present example. CPUs 20(1)-20(N) may be capable of performing certain computing tasks including, but not limited to, executing instructions of a computer program including performing calculations, logical operations, control operations, and input/output operations. GPUs 30(1)-30(M) may perform mathematically intensive operations to create images (e.g., 3-D images) intended for output to a display. CPU side caches 25(1)-25(N) can include one or more levels of cache. For example, the CPU side caches may include level 1 (L1) and level 2 (L2) caches. GPU side caches 35(1)-35(M) may also include one or more types of cache. For example, the GPU side caches may include level 1 (L1) caches and texture caches for graphics processing. In an example, the CPU and GPU side caches may be implemented as static random access memory (SRAM).

An on-chip interconnect 40 can serve as communication paths between the CPUs and other components and between the GPUs and other components. In particular, the interconnect may provide communication between the multiple diverse processing devices and the shared resources, such as LLC 50 and cache controller 60. Although interconnect 40 is also illustrated as a shared resource, it should be apparent that other implementations, such as a partitioned interconnect (e.g., one for CPUs and one for GPUs) could also be implemented in embodiments disclosed herein. Interconnect 40 may also be coupled to other elements (not shown) including, but not necessarily limited to, input devices (e.g., keyboard, mouse, touch screen, trackball, etc.), output devices (e.g., graphics controller coupled to a video display, printer, etc.), and storage devices (e.g., hard disks, floppy disks, universal serial bus devices (USBs) etc.).

LLC 50 is shared by the multiple diverse processing devices (e.g., CPUs and GPUs). LLC 50 is typically bigger than the CPU and GPU side caches. In an embodiment, LLC 50 can be partitioned into cache lines, with each cache line holding a block from system memory 70. In at least one embodiment, system memory 70 may be implemented as dynamic random access memory (DRAM), and may be logically partitioned into blocks that can be mapped to cache lines in LLC 50. At any given time, however, only a subset of blocks from system memory 70 are mapped to LLC 50.

In at least some examples, LLC 50 can provide hardware-based coherency or software-based coherency (or some suitable combination of both) between the diverse processing devices, such as CPUs 20(1)-20(N) and GPUs 30(1)-30(M). The hardware-based coherency between CPUs and GPUs may need to be modified to account for cases where, as a result of the dynamic fill policy logic, data forwarding from the cache in cases of a cache hit will not result in data forwarding the cache but instead will be accompanied by a memory reference. For example, this may be the case in an implementation of an inclusive cache (i.e., data in higher level caches are included in lower level caches). In one possible implementation, an inclusive cache may be modified to hold a control bit for each cache-line, where the control bit indicates whether tag entry points to a valid data segment or not.

In other cases, the hardware-based coherency protocol may not be changed as a result of the dynamic fill policy logic, since it already includes an option for HW-based coherency without always allocating data segments into the cache. For example, this may be the case in an implementation of a non-inclusive cache. In this latter example, the cache controller may decide during a cache-miss request phase whether to issue a memory reference that will result in a cache fill or not, based on the dynamic fill policy logic. In this case, the cache controller may further notify the processing device on its decision to fill or not-fill the data into the cache, leaving an option to the processing device to utilize the cache as a victim-cache in case the data was not filled.

Cache controller 60 is a device that manages the flow of data between processing devices, system memory and cache memory. For example, this device can be computer hardware in the form of special digital circuitry. Cache controller 60 can receive and process memory access requests (e.g., read request, write request) from processing devices such as CPUs 20(1)-20(N) and GPUs 30(1)-30(M). Cache controller 60 may be implemented separately from the processing devices and communicatively coupled to the processing devices via a communication channel (e.g., interconnect 40). Cache controller 60 can also access system memory 70, for example, to send memory access requests when a read request from a processing device cannot be served by the data in LLC 50. Memory controller 72, which can include a scheduler (not shown), may be a digital circuit that manages the flow of data going to and from system memory 70. Cache controller 60 can communicate with memory controller 72 to access system memory 70. Memory controller 72 can also access processing devices directly, for example, when cache controller 60 indicates that data should be provided directly to a processing device rather than filling LLC 50.

In at least one embodiment, cache controller 60 is provisioned with LLC fill logic 62 and dynamic fill policy logic 64. LLC fill logic 62 enables cache controller 60 to receive memory access requests from processing devices, perform LLC lookups, and respond when a lookup in the LLC results in a hit. Generally, data requested by the CPUs and GPUs can be stored in LLC 50, and when subsequent requests are made for the same data, LLC fill logic 62 can retrieve the data from the LLC and provide the data to the requesting device rather than accessing system memory 70 again for the data. When a lookup in the LLC results in a miss, the request is typically held in LLC request buffer 55 until the data is filled into the LLC from system memory 70.

In embodiments disclosed herein, dynamic fill policy logic 64 enables cache controller 60 to operate more efficiently when an LLC lookup results in a miss for particular processing devices. When an LLC lookup for requested data results in a miss, dynamic fill policy logic 64 is invoked if a dynamic fill policy is applicable to the data request (e.g., read request) based on the requesting device. For example, dynamic fill policy logic 64 can be invoked for data requests received from devices that have low hit rates, such as GPUs 30(1)-30(M), relative to other processing devices in the same system. Dynamic fill policy logic 64 enables determining whether to fill LLC 50 based on the occupancy of LLC request buffer (LRB) 55. In one example, when a request for data is received from a processing device, a comparison of the actual filled amount of LRB 55 to a threshold that represents a fill limit can indicate whether to deallocate a relevant entry of the LRB because the LRB is too full (e.g., when it contains outstanding requests nearing maximum capacity). If the LRB is not too full, as determined based on the threshold, then the request (or an indication of the request) is held in the LRB until the data is filled into the LLC from system memory 70. Thus, the outstanding request is tracked in the LRB while cache controller 60 accesses system memory 70 to obtain the requested data. However, if the LRB is too full due to too many entries being filled, as determined based on the threshold, then the entry corresponding to the request is removed from the LRB. In addition, the data retrieved from the system memory is sent directly to the requesting device from system memory 70 and is not filled in the LLC.

As used herein, an entry in an LRB is considered to 'correspond to' a request from a processing device during the period that information indicating the request is stored in the entry. In one non-limiting example, the entry could include a request for data generated by the cache controller to be sent to the system memory. In another example, the entry could include the request for data (e.g., read request) received from the processing device. Generally, the entry could include any information that is associated with and provides an indication of the request for data.

In an example, dynamic fill policy heuristics that favor higher cache rates versus better memory bandwidth utilizations can be controlled by software. For example, software may be configured to control DFP-related parameters, such as a threshold used determine whether to deallocate an entry in the LRB and not fill the lower level cache with data from system memory. Such parameters can be statically set or adaptively modified until a desired optimum run-time configuration is achieved. Such adaptive modifications could be based on run-time information (e.g., performance, bandwidth, latency, etc.) collected during actual run-times in which the dynamic fill policy is invoked for one or more requests for data to determine whether to deallocate a relevant entry in the LRB and not fill the lower level cache with the requested data.

It should be appreciated that a computing system with diverse processing devices such as GPUs and CPUs offers a particular, non-limiting example implementation in which a dynamic fill policy may be advantageously applied to the GPUs, due to their comparatively lower hit rates. References to GPUs and CPUs are used herein for ease of explanation and are not intended to limit the broad application of the concepts contained herein. Accordingly, it should be noted and appreciated that a dynamic fill policy could be advantageously applied to a computing system that incorporates any types of diverse processing devices where at least one processing device incorporated in the computing system has a different shared cache sensitivity than one or more other processing devices incorporated in the computing system. For example, accelerated processing units (APUs), field-programmable gate arrays (FPGAs), digital signal processors (DSPs), application-specific integrated circuits (ASICs), and other similar elements could potentially benefit from the broad concepts disclosed herein related to a dynamic fill policy. Thus, references herein to 'processing device' are intended to include any such elements.

Requests are a form of electronic communications in computing system 10. In at least one embodiment, requests include read requests and write requests. Generally, a read request is a request to access data. The requested data is typically stored in system memory and may or may not also be stored in cache at any given time. Electronic communications (also referred to herein as 'communications'), may be inclusive of signals, bits, bytes, data, objects, etc., and can be sent and received by components of computing system 10 according to any suitable communication messaging protocols. Suitable communication messaging protocols can include bus protocols, pipelined protocols, etc. The term 'data' as used herein, refers to any type of binary, numeric, voice, video, textual, photographic, or script data, or any type of source or object code, or any other suitable information in any appropriate format that may be communicated from one point to another in a computing system and/or networks. Like requests, other types of information such as messages, responses, replies, queries, etc. are also forms of communications.

Figure 2:
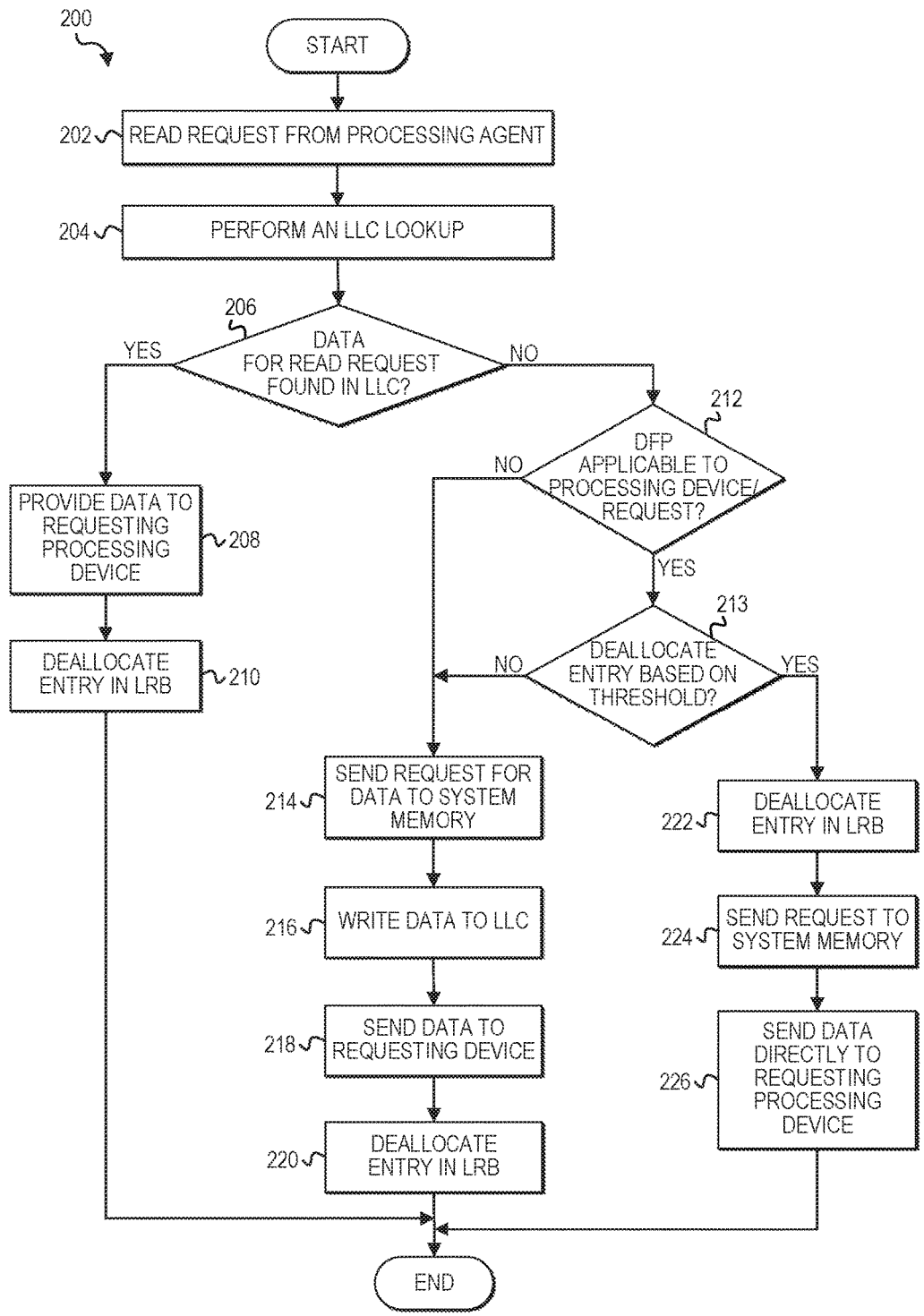
FIG. 2 is a simplified flowchart of potential operations associated with the computing system according an embodiment of the present disclosure.

Turning to FIG. 2, a flowchart illustrates a flow 200 of possible operations in one or more embodiments of computing system 10. Computing system 10 may comprise means such as a cache controller (e.g., 60) and/or memory controller (e.g., 72), for performing the operations. In one example, at least some operations shown in flow 200 may be performed by one or both of LLC fill logic 62 and dynamic fill policy logic 64. Flow 200 illustrates an example read request flow.

At 202, a read request is received by cache controller 60 from a processing device, such as CPUs 20(1)-20(N) or GPUs 30(1)-30(M). In this example, the read request may be requesting access to data. An entry in an LLC request buffer, such as LRB 55, can be allocated and filled with information corresponding to the read request. At 204, an LLC lookup is performed. The LLC lookup is a search of LLC 50 to determine whether data responsive to the read request is present in the lower level cache. At 206, a determination is made as to whether a hit resulted from the search. If it is determined that a hit resulted from the search (i.e., data requested by the read request is found in the LLC), then at 208, the data is directly returned from the LLC to the requesting device. In at least one embodiment, the data is returned by the cache controller. For example, if CPU 20(1) requested the data, then at 208, the requested data is provided by cache controller 60 directly to CPU 20(1) from LLC 50. Similarly, if GPU 30(1) requested the data, then at 208, the requested data is provided by cache controller 60 directly to GPU 30(1) from LLC 50. At 210, the entry in LRB 55 that corresponds to the read request is deallocated. Accordingly, the information that indicates the satisfied read request is removed from LRB 55. It should be noted, however, that the LRB may still contain other outstanding requests from processing devices.

If, at 206, it is determined that a miss resulted from the search of LLC 50, then at 212, a determination may be made as to whether a dynamic fill policy is applicable to the read request. In an example, the dynamic fill policy may be applicable to a read request received from a processing device that has a comparatively lower hit rate. In some embodiments, processing devices in a computing system may be predetermined to have low hit rates. For example, GPUs 30(1)-30(M) may be predetermined to have lower hit rates and less sensitivity to data access latency than the other on-chip processing devices. Thus, the dynamic fill policy can be predetermined to be applicable to read requests from all of the GPUs. In this example, CPUs 20(1)-20(N) may be predetermined to have higher hit rates and more sensitivity to data access latency than other on-chip processing devices. Thus, the dynamic fill policy can be predetermined to be not applicable to read requests from the CPUs. Accordingly, in this example at 212, a determination could be made as to whether the read request was received from a GPU with a predetermined low hit rate or from any GPU if all GPUs have predetermined low hit rates. In other implementations, a dynamic determination may be made as to whether a read request was issued by a processing device having a low hit rate based on a hit-rate threshold.

In yet another embodiment, at 212, a read request may be evaluated to determine whether it is marked to indicate that the dynamic fill policy is to be applied to that read request. In this embodiment, a software driver may be configured to exploit additional information available from a software application that is causing read requests to be generated. The software application may provide more coarse, and comparatively less accurate, information regarding LLC re-use of certain software buffers. The dynamic fill policy can be invoked only for requests that the software marks as having a lesser chance of getting re-used from the LLC. Thus, the software may mark a request for data based on a probability threshold that the data will be re-used from the LLC. This can maximize the benefits from LLC re-use as well as achieving peak system memory (e.g., DRAM) bandwidth.

If at 212, a determination is made that a dynamic fill policy is applicable to the read request, then at 213, a determination can be made as to whether to deallocate an entry in the buffer based, at least in part, on a threshold. The entry to potentially be deallocated contains information indicating the read request. In at least one example, the determination at 213 of whether to deallocate the entry is a determination of whether the LRB is getting too full (e.g., nearing maximum capacity) according to a threshold. It will be apparent that this determination can achieve the same result using various types of evaluations.

For example, in a first technique, the threshold could represent an amount of occupied or filled entries in the LRB. Specifically, this threshold could represent a maximum number of filled entries or percentage of filled entries that the LRB may contain without being in pressure or too full. Thus, if the actual number of filled entries or percentage of filled entries in the LRB exceeds the threshold, then the determination at 213 can be that the relevant entry in the LRB (i.e., the entry that corresponds to the read request) is to be deallocated because the LRB is too full. If the actual number of filled entries or percentage of filled entries in the LRB does not exceed the threshold, then the determination at 213 can be that the relevant entry in the LRB is not to be deallocated because the LRB is not too full.

In a variation, the threshold can represent a minimum number of filled entries or percentage of filled entries in the LRB that indicate the LRB is too full. Thus, if the actual number of filled entries or percentage of filled entries in the LRB meets or exceeds the threshold, then the determination at 213 can be that the relevant entry in the LRB is to be deallocated because the LRB is too full. If the actual number of filled entries or percentage of filled entries in the LRB does not meet or exceed the threshold, then the determination at 213 can be that the relevant entry in the LRB is not to be deallocated because the LRB is not too full.

In a second technique, the threshold could represent an amount of unoccupied or free entries in the LRB. Specifically, this threshold could represent a minimum number of free entries or percentage of free entries that indicate the LRB is not in pressure or too full. Thus, if the actual number of free entries or percentage of free entries in the LRB meets or exceeds the threshold, then the determination at 213 can be that the relevant entry in the LRB (i.e., the entry that corresponds to the read request) is not to be deallocated because the LRB is not too full. If the actual number of free entries or percentage of free entries in the LRB does not meet or exceed the threshold, however, then the determination at 213 can be that the relevant entry in the LRB is to be deallocated because the LRB is too full.

In a variation, the threshold can represent a maximum number of free entries or percentage of free entries in the LRB that indicate the LRB is in pressure or too full. Thus, if the actual number of free entries or percentage of free entries in the LRB does not exceed the threshold, then the determination at 213 can be that the relevant entry in the LRB is to be deallocated because the LRB is too full. If the actual number of free entries or percentage of free entries in the LRB exceeds the threshold, then the determination at 213 can be that the relevant entry in the LRB is not to be deallocated because the LRB is not too full.

It should also be noted that the unit of measurement is described in terms of entries in the LRB. However, any other suitable unit of measurement may also be used. For example, number or percentages of bits, bytes, lines, blocks, etc. may be compared to a threshold based on the same unit of measurement. Furthermore, the above techniques for determining whether to deallocate an LRB entry based on the LRB being in pressure or too full are for illustrative purposes only, and are not intended to limit the broad scope of this disclosure. For example, any other suitable evaluation may be used to determine whether the LRB is in pressure or too full according to the present disclosure.

If a determination is made at 213 that the relevant entry in the LRB is not to be deallocated based on the threshold, or if a determination is made at 212 that the dynamic fill policy is not applicable to the read request, then the read request (or an indication of the read request) is held in the LRB while a request for the data is sent to the system memory and the data is filled into the LLC from system memory. More specifically, at 214, a request is sent to the system memory for the data. In at least one embodiment, the request sent to the system memory is generated by the cache controller based on the read request. At 216, the data is written from the system memory to the LLC. At 218, the data is sent by the cache controller from the LLC to the requesting device. At 220, the entry in LRB 55 corresponding to the read request is deallocated. Thus, once the read request has been satisfied, the information that indicates the read request is removed from the LRB.

If a determination is made at 213 that the relevant entry in the LRB is to be deallocated based on the threshold, and if a determination is made at 212 that the dynamic fill policy is applicable to the read request, then the LLC is not filled with more data to serve the request. Instead, the request is served directly from system memory. More specifically, at 222, the entry in LRB 55 corresponding to the read request is deallocated. Thus, the information that indicates the outstanding read request is removed from the LRB. At 224, a request for the data is sent to the system memory. In at least one embodiment, the request sent to the system memory is generated by the cache controller based on the read request. The request sent to the system memory provides an indication that the requested data is to be sent directly to the requesting device.

Based on the received request, at 226, the requested data is sent directly from the system memory to the requesting device (e.g., GPU) and is not stored in the LLC. In at least one embodiment, memory controller 72 of system memory 70 understands the indication in the request from cache controller 60 to send the requested data directly to the requesting device. Accordingly, the requested data may be retrieved from system memory and sent to the requesting device by memory controller 72. In at least one embodiment, each subsequent request from a processing device is processed using the same or similar flows as described with reference to FIG. 2.

A benefit of filling a cache line in LLC 50 from system memory 70 is that a future reference to this cache line can be fetched from the LLC at a lower latency and higher bandwidth. However, this comes at a cost of larger LRB entries since they must cover the system memory latency. In general, the LRB occupancy can provide an indication of the LLC hit rates. When the hit rates are high for a certain application phase, there will be less outstanding requests to system memory and hence, more LRB entries will be free. When the LLC hit rates are very poor, however, then most of the LRB entries will be used to cover the system memory latency for filling the cache lines of the LLC. In the scenario where LLC hit rates are low, the size of the LRB limits the number of outstanding requests to system memory, which determines the fabric depth and the look ahead required for the memory controller to achieve higher bandwidth. In this scenario where the size of the LRB limits the system memory bandwidth, dynamic fill policy logic 64 of cache controller 60 converts requests to not fill in cache lines of the LLC and deallocates the entries in the LRB that correspond to these requests (i.e., the information contained in each entry being deallocated is removed). This relieves the LRB pressure, which helps the system memory scheduler achieve higher bandwidth, at a cost of sacrificing potential LLC hit rates. As shown by graphs in FIGS. 3-4, the LRB occupancy is an efficient metric for throttling down GPU LLC fill requests, and with this metric for GPU workloads, the increase in memory bandwidth more than compensates for the reduction in LLC hit rates.

Figure 3:
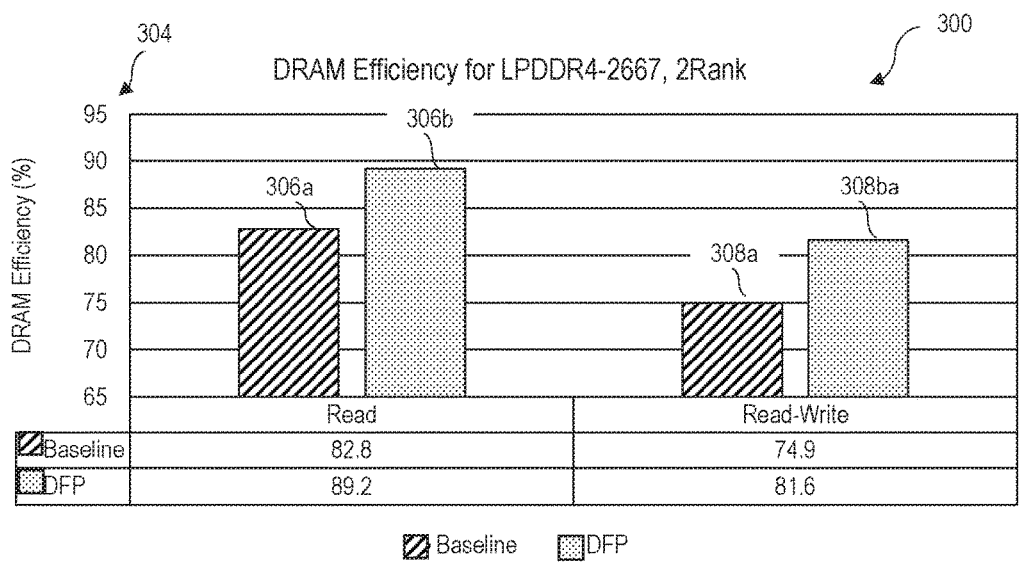
FIG. 3 is a bar graph showing an example of system memory efficiency based on example benchmarks generated in the computing system.

FIG. 3 is a bar graph 300 showing an example of system memory (DRAM) efficiency 304 of a computing system with a dynamic fill policy (e.g., computing system 10), based on micro-benchmarks that were tested in the computing system. Micro-benchmarks are a form of electronic communications. The tested micro-benchmarks include a read-only test with only read requests and a read-write test with equal proportions of read requests and write requests. More specifically, FIG. 3 shows the impact of a dynamic fill policy on bandwidth kernels from a GPU, which operates on buffers that are much larger than the LLC size. For these kernels, the LLC does not provide any benefit from caching. However, since the LRB is not able to provide the look-ahead needed for a DRAM scheduler to optimize bandwidth, a drop in performance occurs. The Y-axis of bar graph 300 represents DRAM efficiency 304 by percentages. Bars 306a and 308a illustrate baseline DRAM efficiencies for a computing system without a dynamic fill policy, while bars 306b and 308b illustrate DRAM efficiencies for a computing system with a dynamic fill policy (e.g., computing system 10). As shown by bar 306a, the baseline for a read-only kernel only achieved 82.8% of peak DRAM bandwidth. In a computing system with a dynamic fill policy, however, the LLC request buffer (LRB) pressure is alleviated. Thus, as shown by bar 306*b*, a peak DRAM bandwidth of 89.20% was achieved. Similarly, for a read-write kernel, a computing system with a dynamic fill policy improved the bandwidth from 74.9%, as shown by bar 308*a*, to 81.6%, as shown by bar 308*b*.

Figure 4:
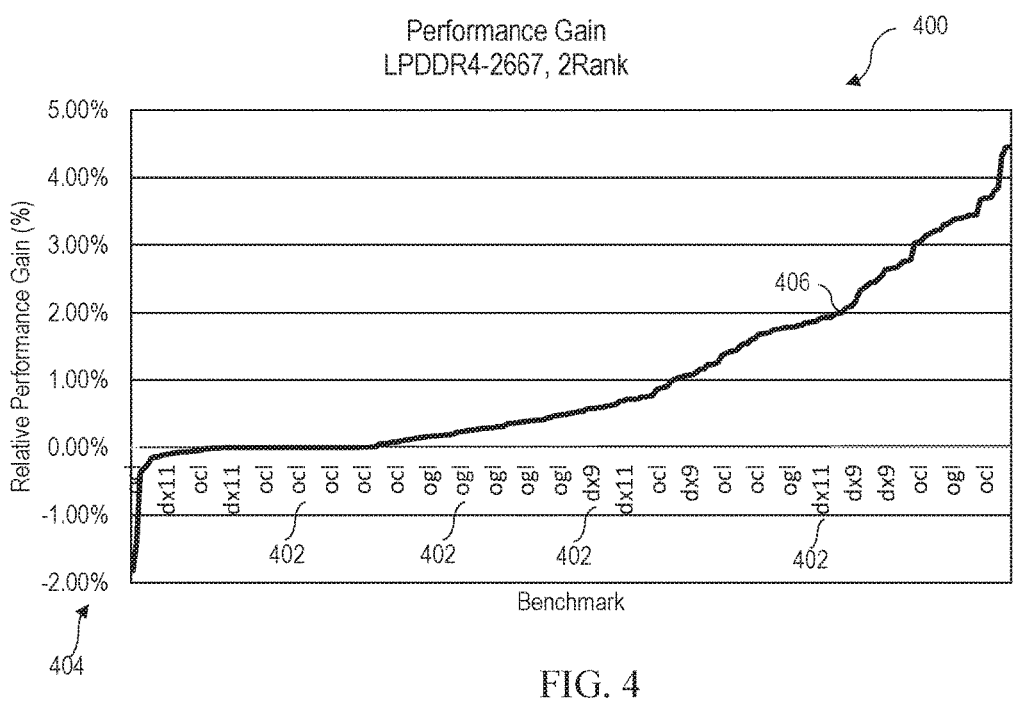
FIG. 4 is a line graph showing an example of relative performance gains of example workloads running on the computing system.

FIG. 4 is a line graph 400 showing an example of relative performance gains 404 of a computing system with a dynamic fill policy, according to various actual GPU benchmarks 402. The X-axis of graph 400 represents benchmarks of various workloads 402 (e.g., games) using different graphics technologies including Microsoft® DirectX® 11 (dx11), Microsoft® DirectX® 9 (dx9), Open Computing Language (ocl), and AMD OpenGL (ogl). Microsoft DirectX is a registered trademark of Microsoft, Inc. The Y-axis of graph 400 represents the relative performance gains (in percentages) for the various workloads running in a computing system with a dynamic fill policy, such as computing system 10. The workloads are sorted along the X-axis based on performance gains from lowest to highest. As shown by a plot line 406 in graph 400, on average, a GEOMEAN of 1% was gained with certain games gaining more than 4% over baseline workloads running in a computing system that does not dynamically fill last level cache. Very few negative outliers are present (i.e., maximum is within −2%). While embodiments described herein are expected to provide higher bandwidth when LLC hit rates are low, real benchmarks exhibit a combination of various LLC hit rates and different bandwidth requirements. In embodiments of the present disclosure, however, the dynamic fill policy is invoked only when the LLC hit rates are low and a comparison of the LRB with a threshold indicates the LRB is in pressure/too full as previously described herein. For workloads that have good LLC hit rates, the LRB does not experience pressure and hence, performs almost the same as a baseline.

In embodiments according to the present disclosure, as shown in FIGS. 3-4, a dynamic fill policy can improve the performance of GPU kernels targeting system memory bandwidth by removing the LLC request buffer limitation for the LLC. The dynamic fill policy can also improve the performance of real world benchmarks by maximizing the system memory bandwidth of low LLC hit rate applications. The dynamic fill policy can further provide the hooks necessary for software drivers to maximize performance by providing coarse LLC re-use information from the application.

The figures described below detail exemplary architectures and systems to implement embodiments of the above. In some embodiments, one or more hardware components and/or instructions described above are emulated as detailed below, or implemented as software modules.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

FIG. 5A is a block diagram illustrating both an exemplary in-order pipeline and an exemplary register renaming, out-of-order issue/execution pipeline according to embodiments of the present disclosure. FIG. 5B is a block diagram illustrating both an exemplary embodiment of an in-order architecture core and an exemplary register renaming, out-of-order issue/execution architecture core to be included in a processor according to embodiments of the present disclosure. The solid lined boxes in FIGURES SA-SB illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 5A, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524.

FIG. 5B shows processor core 590 including a front end unit 530 coupled to an execution engine unit 550, and both are coupled to a memory unit 570. Core 590 may be a reduced instruction set computing (RISC) core, a complex instruction set computing (CISC) core, a very long instruction word (VLIW) core, or a hybrid or alternative core type. As yet another option, core 590 may be a special-purpose core, such as, for example, a network or communication core, compression engine, coprocessor core, general purpose computing graphics processing unit (GPGPU) core, graphics core, or the like.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 540 may be implemented using various different mechanisms. Examples of suitable mechanisms include, but are not limited to, look-up tables, hardware implementations, programmable logic arrays (PLAs), microcode read only memories (ROMs), etc. In one embodiment, core 590 includes a microcode ROM or other medium that stores microcode for certain macroinstructions (e.g., in decode unit 540 or otherwise within the front end unit 530). The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations, central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit(s) 558 comprises a vector registers unit, a write mask registers unit, and a scalar registers unit. These register units may provide architectural vector registers, vector mask registers, and general purpose registers. The physical register file(s) unit(s) 558 is overlapped by the retirement unit 554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which includes a data TLB unit 572 coupled to a data cache unit 574 coupled to a level 2 (L2) cache unit 576. In one exemplary embodiment, the memory access units 564 may include a load unit, a store address unit, and a store data unit, each of which is coupled to the data TLB unit 572 in the memory unit 570. The instruction cache unit 534 is further coupled to a level 2 (L2) cache unit 576 in the memory unit 570. The L2 cache unit 576 is coupled to one or more other levels of cache and eventually to a main memory.

By way of example, the exemplary register renaming, out-of-order issue/execution core architecture may implement the pipeline 500 as follows: 1) the instruction fetch 538 performs the fetch and length decoding stages 502 and 504; 2) the decode unit 540 performs the decode stage 506; 3) the rename/allocator unit 552 performs the allocation stage 508 and renaming stage 510; 4) the scheduler unit(s) 556 performs the scheduling stage 512; 5) the physical register file(s) unit(s) 558 and the memory unit 570 perform the register read/memory read stage 514; the execution cluster 560 performs the execute stage 516; 6) the memory unit 570 and the physical register file(s) unit(s) 558 performs the write back/memory write stage 518; 7) various units may be involved in the exception handling stage 522; and 8) the retirement unit 554 and the physical register file(s) unit(s) 558 perform the commit stage 524.

The core 590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 534/574 and a shared L2 cache unit 576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 6B:
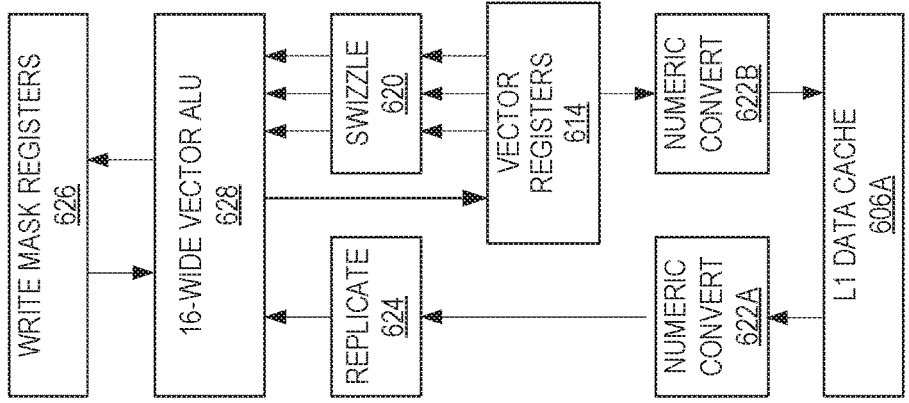
FIGS. 6A-6B illustrate a block diagram of a more specific exemplary in-order core architecture, which core could be one of several logic blocks (including other cores of the same type and/or different types) in a chip.
Figure 6A:
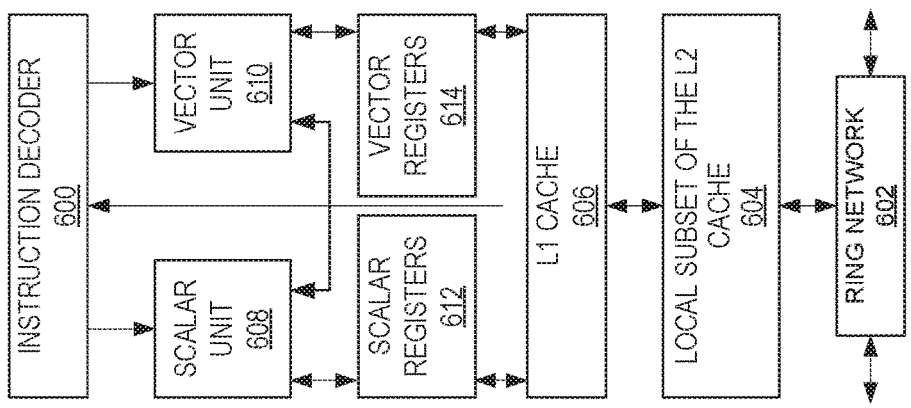

FIGS. 6A-6B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 6A is a block diagram of a single processor core, along with its connection to the on-die interconnect network 602 and with its local subset of the Level 2 (L2) cache 604, according to embodiments of the present disclosure. In one embodiment, an instruction decoder 600 supports the x86 instruction set with a packed data instruction set extension. An L1 cache 606 allows low-latency accesses to cache memory into the scalar and vector units. While in one embodiment (to simplify the design), a scalar unit 608 and a vector unit 610 use separate register sets (respectively, scalar registers 612 and vector registers 614) and data transferred between them is written to memory and then read back in from a level 1 (L1) cache 606, alternative embodiments of the present disclosure may use a different approach (e.g., use a single register set or include a communication path that allows data to be transferred between the two register files without being written and read back).

The local subset of the L2 cache 604 is part of a global L2 cache that is divided into separate local subsets, one per processor core. Each processor core has a direct access path to its own local subset of the L2 cache 604. Data read by a processor core is stored in its L2 cache subset 604 and can be accessed quickly, in parallel with other processor cores accessing their own local L2 cache subsets. Data written by a processor core is stored in its own L2 cache subset 604 and is flushed from other subsets, if necessary. The ring network ensures coherency for shared data. The ring network is bi-directional to allow agents such as processor cores, L2 caches and other logic blocks to communicate with each other within the chip. Each ring data-path can be 1012-bits wide per direction.

FIG. 6B is an expanded view of part of the processor core in FIG. 6A according to embodiments of the present disclosure. FIG. 6B includes an L1 data cache 606A part of the L1 cache 604, as well as more detail regarding the vector unit 610 and the vector registers 614. Specifically, the vector unit 610 is a 16-wide vector processing unit (VPU) (see the 16-wide ALU 628), which executes one or more of integer, single-precision float, and double-precision float instructions. The VPU supports swizzling the register inputs with swizzle unit 620, numeric conversion with numeric convert units 622A-B, and replication with replication unit 624 on the memory input. Write mask registers 626 allow predicating resulting vector writes.

Figure 7:
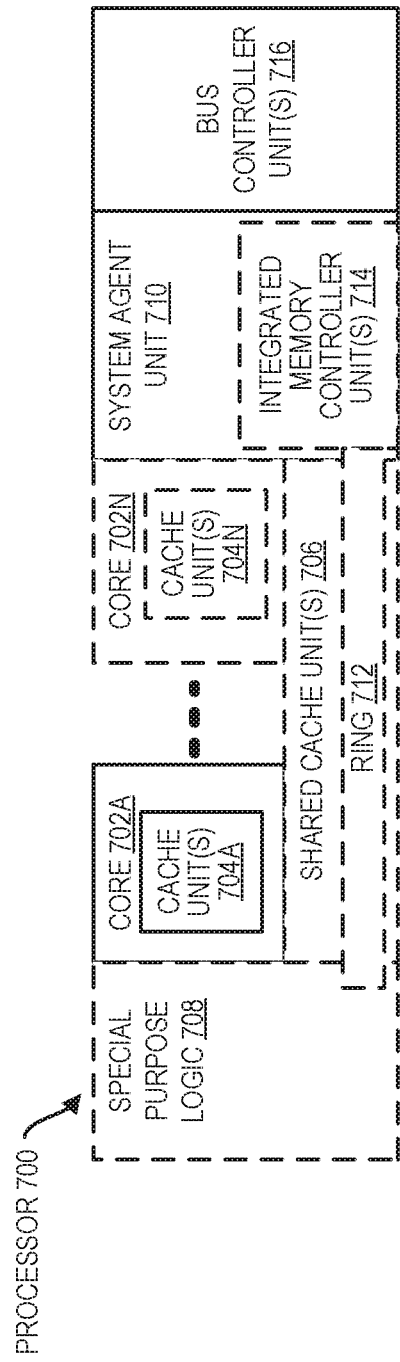
FIG. 7 is a block diagram of a processor that may have more than one core, may have an integrated memory controller, and may have integrated graphics according to an embodiment.

FIG. 7 is a block diagram of a processor 700 that may have more than one core, may have an integrated memory controller, and may have integrated graphics according to embodiments of the present disclosure. The solid lined boxes in FIG. 7 illustrate a processor 700 with a single core 702A, a system agent 710, a set of one or more bus controller units 716, while the optional addition of the dashed lined boxes illustrates an alternative processor 700 with multiple cores 702A-N, a set of one or more integrated memory controller unit(s) 714 in the system agent unit 710, and special purpose logic 708.

Thus, different implementations of the processor 700 may include: 1) a CPU with the special purpose logic 708 being integrated graphics and/or scientific (throughput) logic (which may include one or more cores), and the cores 702A-N being one or more general purpose cores (e.g., general purpose in-order cores, general purpose out-of-order cores, a combination of the two); 2) a coprocessor with the cores 702A-N being a large number of special purpose cores intended primarily for graphics and/or scientific (throughput); and 3) a coprocessor with the cores 702A-N being a large number of general purpose in-order cores. Thus, the processor 700 may be a general-purpose processor, coprocessor, or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 700 may be a part of and/or may be implemented on one or more substrates using any of a number of process technologies, such as, for example, BiCMOS, CMOS, or NMOS.

The memory hierarchy includes one or more levels of cache within the cores, a set of one or more shared cache units 706, and external memory (not shown) coupled to the set of integrated memory controller units 714. The set of shared cache units 706 may include one or more mid-level caches, such as level 2 (L2), level 3 (L3), level 4 (L4), or other levels of cache, a last level cache (LLC), and/or combinations thereof. While in one embodiment a ring based interconnect unit 712 interconnects the integrated graphics logic 708, the set of shared cache units 706, and the system agent unit 710/integrated memory controller unit(s) 714, alternative embodiments may use any number of well-known techniques for interconnecting such units. In one embodiment, coherency is maintained between one or more cache units 704A-N and cores 702-A-N.

In some embodiments, one or more of the cores 702A-N are capable of multithreading. The system agent 710 includes those components coordinating and operating cores 702A-N. The system agent unit 710 may include for example a power control unit (PCU) and a display unit. The PCU may be or include logic and components needed for regulating the power state of the cores 702A-N and the special purpose logic 708, such as integrated graphics logic. The display unit is for driving one or more externally connected displays.

The cores 702A-N may be homogenous or heterogeneous in terms of architecture instruction set; that is, two or more of the cores 702A-N may be capable of executing the same instruction set, while others may be capable of executing only a subset of that instruction set or a different instruction set.

Typically, the dynamic fill policy concepts disclosed herein can be implemented in a heterogeneous system. For example, in a system with integrated GPU and CPU cores, the dynamic fill policy may be applicable to data requests from the GPU and not applicable to data requests from the CPU cores (e.g., simultaneous multithreading (SMT) cores). It may be possible, however, that different cores of a homogenous system, such as processor 700 in FIG. 7, (or different cores within a single processing device of a heterogeneous system) may exhibit different sensitivities to a shared cache, for example, based on the particular applications, instructions, or threads they are executing. Thus, in at least some scenarios, the dynamic fill policy could be implemented to be applicable to data requests from certain cores within a processing device and not applicable to data requests from other cores of the same processing device. In yet another scenario, the dynamic fill policy could potentially be implemented to be applicable to data requests from certain cores within multiple processing devices and not applicable to data requests from other cores of the same multiple processing devices.

Figure 8:
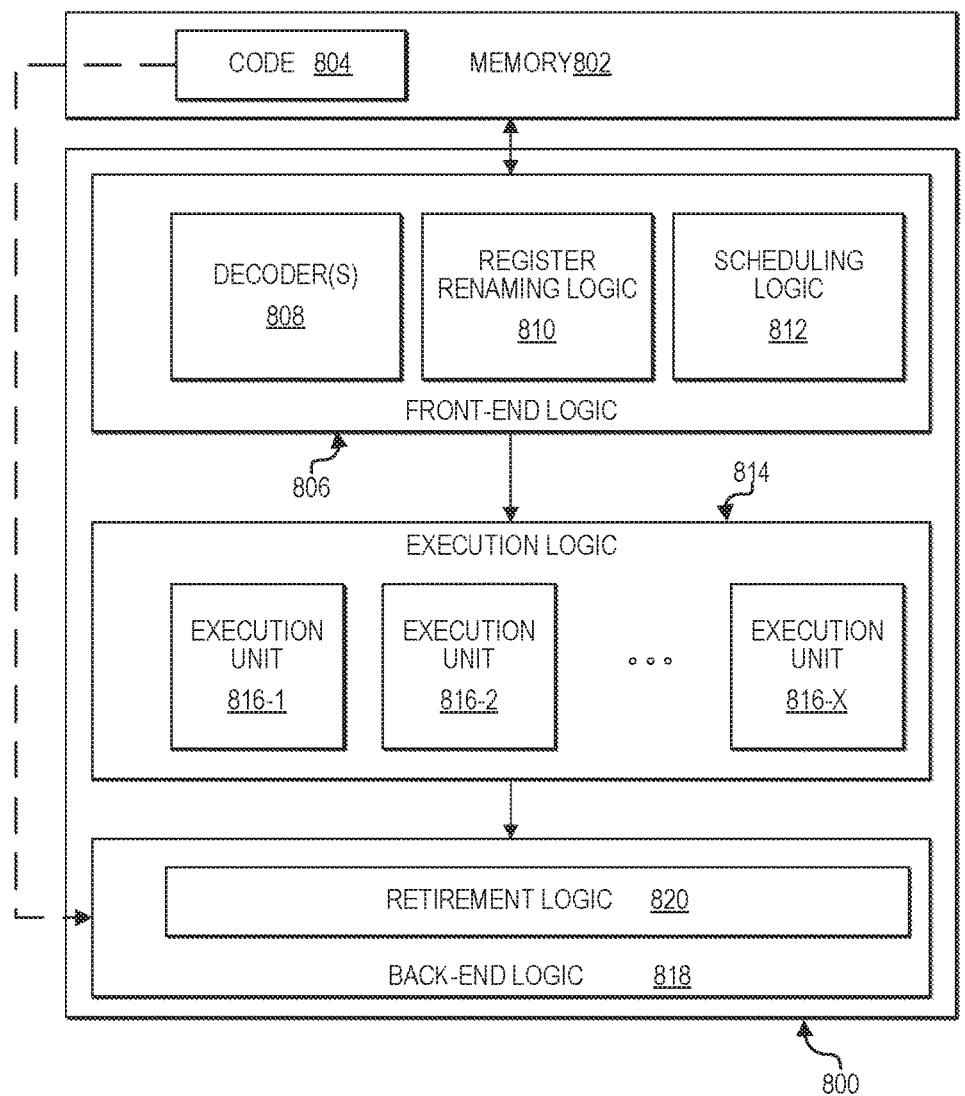
FIG. 8 is a block diagram of a memory coupled to an example processor according to an embodiment.

FIG. 8 is an example illustration of a processor (or processing device) according to an embodiment. Processor 800 is one possible embodiment of CPUs 20(1)-20(N) of computing system 10 and/or GPUs 30(1)-30(M) of computing system 10. Processor 800 may be any type of processing device, such as a microprocessor, an embedded processor, a digital signal processor (DSP), a network processor, a multi-core processor, a single core processor, or other device to execute code. A single processing element may include one or more of processor 800 illustrated in FIG. 8. Processor 800 may be a single-threaded core or, for at least one embodiment, the processor 800 may be multi-threaded in that it may include more than one hardware thread context (or "logical processor") per core.

FIG. 8 also illustrates a memory 802 coupled to processor 800 in accordance with an embodiment. Memory 802 is one example of system memory 70 of computing system 10. Memory 802 may be any of a wide variety of memories (including various layers of memory hierarchy) as are known or otherwise available to those of skill in the art. Such memory elements can include, but are not limited to, static random access memory (SRAM), dynamic random access memory (DRAM), read only memory (ROM), logic blocks of a field programmable gate array (FPGA), erasable programmable read only memory (EPROM), and electrically erasable programmable ROM (EEPROM).

Code 804, which may be one or more instructions to be executed by processor 800, may be stored in memory 802. Code 804 can include instructions of various logic and components that may be stored in software, hardware, firmware, or any suitable combination thereof, or in any other internal or external component, device, element, or object where appropriate and based on particular needs. In one example, processor 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor 800 can also include execution logic 814 having a set of execution units 816-1 through 816-X. Some embodiments may include a number of execution units dedicated to specific functions or sets of functions. Other embodiments may include only one execution unit or one execution unit that can perform a particular function. Execution logic 814 can perform the operations specified by code instructions.

After completion of execution of the operations specified by the code instructions, back-end logic 818 can retire the instructions of code 804. In one embodiment, processor 800 allows out of order execution but requires in order retirement of instructions. Retirement logic 820 may take a variety of known forms (e.g., re-order buffers or the like). In this manner, processor 800 is transformed during execution of code 804, at least in terms of the output generated by the decoder, hardware registers and tables utilized by register renaming logic 810, and any registers (not shown) modified by execution logic 814.

Although not shown in FIG. 8, a processing element may include other elements on a chip with processor 800. For example, a processing element may include memory control logic along with processor 800. The processing element may also include cache control logic, which may be separated or integrated with the memory control logic. The processing element may include I/O control logic and/or may include I/O control logic integrated with memory control logic. The processing element may also include one or more caches. In some embodiments, non-volatile memory (such as flash memory or fuses) may also be included on the chip with processor 800.

FIGS. 9-13 are block diagrams of exemplary computer architectures that may be used in one or more embodiments described herein. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable for use in embodiments of the present disclosure.

Figure 9:
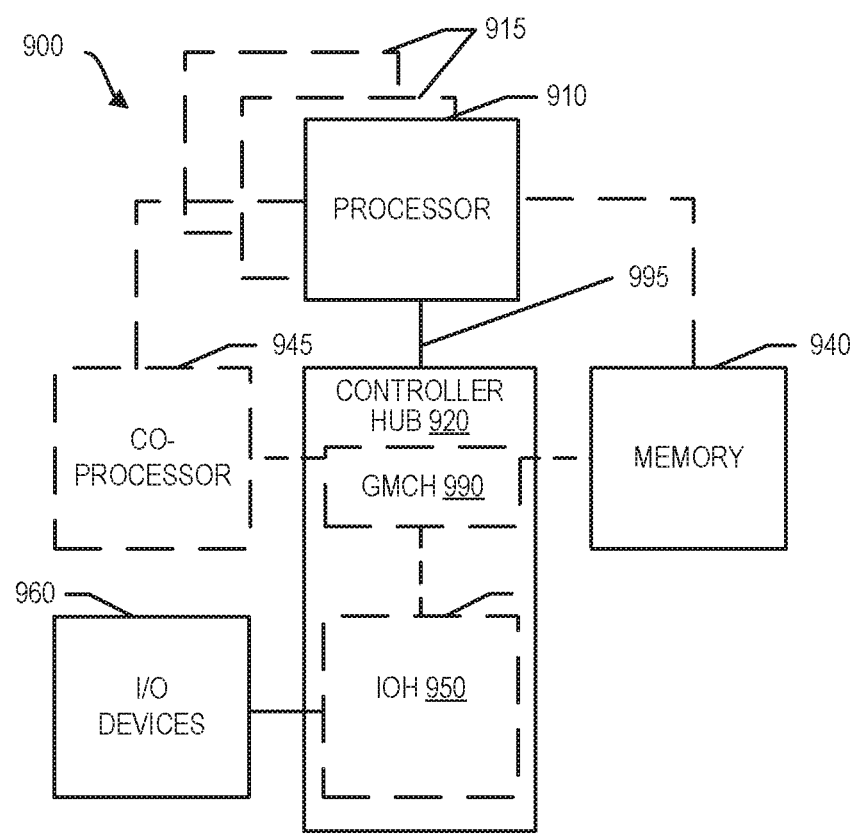
FIGS. 9-13 are block diagrams of exemplary computer architectures.

Referring now to FIG. 9, shown is a block diagram of a system 900 in accordance with one embodiment of the present disclosure. The system 900 may include one or more processors 910, 915, which are coupled to a controller hub 920. In one embodiment, the controller hub 920 includes a graphics memory controller hub (GMCH) 990 and an Input/Output Hub (IOH) 950 (which may be on separate chips); the GMCH 990 includes memory and graphics controllers to which are coupled memory 940 and a coprocessor 945; the IOH 950 couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950.

The optional nature of additional processors 915 is denoted in FIG. 9 with broken lines. Each processor 910, 915 may include one or more of the processing cores described herein and may be some version of the processor 700 or 800.

The memory 940 may be, for example, dynamic random access memory (DRAM), phase change memory (PCM), or a combination of the two. For at least one embodiment, the controller hub 920 communicates with the processor(s) 910, 915 via a multi-drop bus, such as a frontside bus (FSB), point-to-point interface such as QuickPath Interconnect (QPI), or similar connection 995.

In one embodiment, the coprocessor 945 is a special-purpose processor, such as, for example, a high-throughput MIC processor, a network or communication processor, compression engine, graphics processor, GPGPU, embedded processor, or the like. In one embodiment, controller hub 920 may include an integrated graphics accelerator.

There can be a variety of differences between the physical resources 910, 915 in terms of a spectrum of metrics of merit including architectural, microarchitectural, thermal, power consumption characteristics, and the like.

In one embodiment, processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accepts and executes the received coprocessor instructions.

Figure 10:
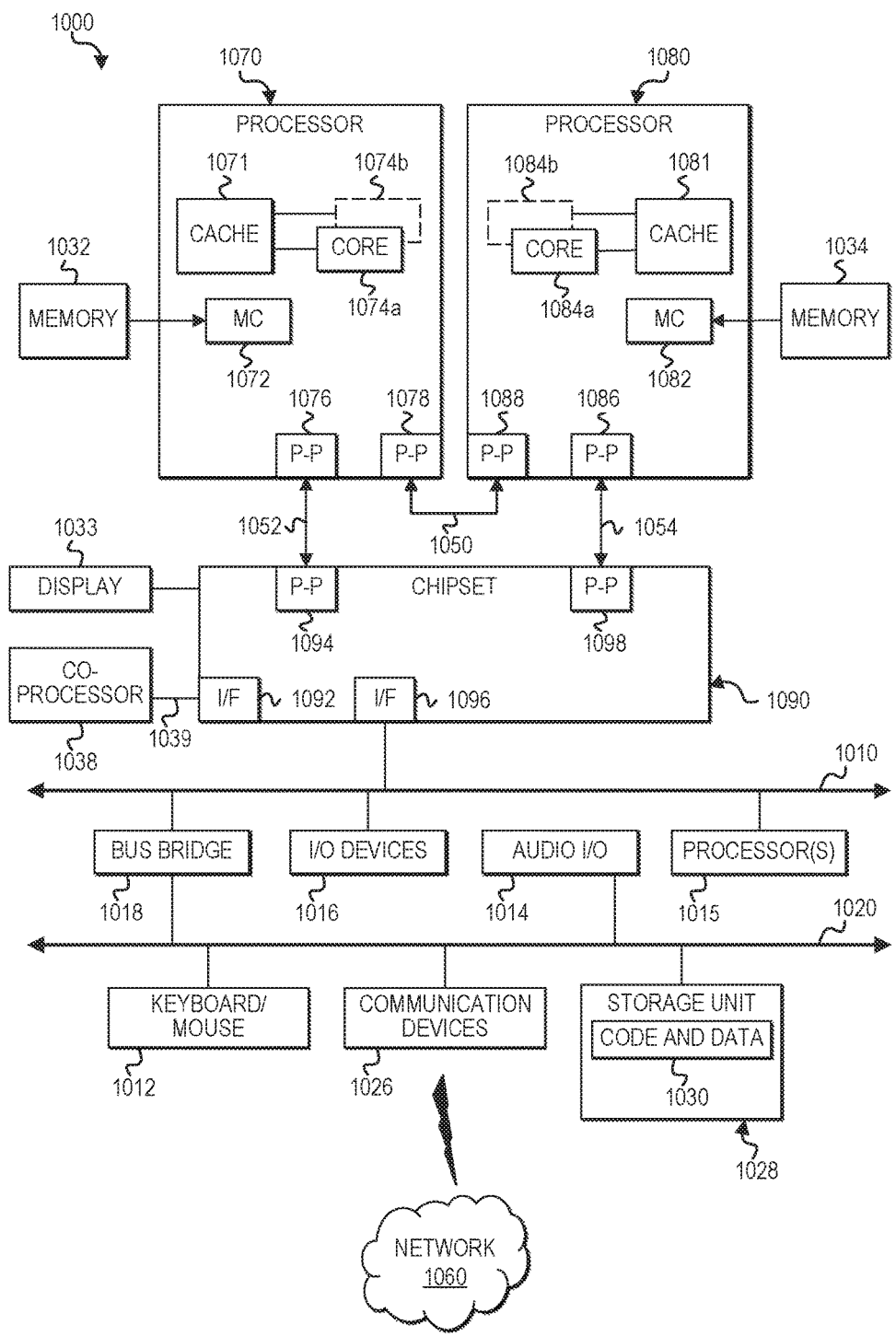

Referring now to FIG. 10, shown is a block diagram of a more specific example computer system 1000 in accordance with an embodiment of the present disclosure. FIG. 10 illustrates a block diagram of a computer system 1000 that is arranged in a point-to-point (PtP) interconnect configuration according to an embodiment. In particular, FIG. 10 shows a multiprocessor computer system where processors, memory, and input/output devices are interconnected by a number of point-to-point interfaces.

Computer system 1000 includes a first processor 1070 and a second processor 1080 coupled via a point-to-point interconnect 1050. Each of the processors 1070 and 1080 may be some version of the processing devices (e.g., CPUs 20(1)-20(N), 30(1)-30(M), processors 700, 800, 910, 915, 945, core 590, etc.) described herein. In at least one embodiment, processors 1070 and 1080 are respectively processors 910 and 915, while coprocessor 1038 is coprocessor 945. In another embodiment, processors 1070 and 1080 are respectively processor 910 and coprocessor 945.

Processors 1070 and 1080 may each include one or more cores 1074a-1074b and 1084a-1084b, respectively. Processors 1070 and 1080 may also include respective integrated memory controller units (MC) 1072 and 1082, which couple the processors to respective memories, such as a memory 1032 and a memory 1034. In alternative embodiments, memory controller units 1072 and 1082 may be discrete logic separate from processors 1070 and 1080. Memories 1032 and/or 1034 may store various data to be used by processors 1070 and 1080 in achieving operations outlined herein. In an embodiment memories 1032 and 1034 may be at least portions of main memory (e.g., system memory 70) locally coupled to their respective processors.

Processors 1070 and 1080 may be any type of processor, such as those discussed with reference to CPUs 20(1)-20(N), GPUs 30(1)-30(M), and processors 700, 800, 910, 915, 945, and core 590. Processors 1070 and 1080 may exchange information via a point-to-point (PtP) interface 1050 using point-to-point interface circuits 1078 and 1088, respectively. Processors 1070 and 1080 may each exchange information with a chipset 1090 via individual point-to-point interfaces 1052 and 1054 using point-to-point interface circuits 1076, 1086, 1094, and 1098. As shown herein, chipset 1090 is separated from processing elements 1070 and 1080. However, in an embodiment, chipset 1090 is integrated with processing elements 1070 and 1080. Also, chipset 1090 may be partitioned differently with fewer or more integrated circuits. Additionally, chipset 1090 may optionally exchange information with a coprocessor 1038 via a high-performance interface 1039, using an interface circuit 1092, which could be a PtP interface circuit. In one embodiment, the coprocessor 1038 is a special-purpose processor, such as, for example, a high-throughput MIC processor, a network or communication processor, compression engine, graphics processor, GPGPU, embedded processor, or the like. Optionally, chipset 1090 may also communicate with a display 1033 for displaying data that is viewable by a human user.

A shared cache (e.g., 1071 or 1081) may be included in either processor 1070 and 1080 and/or may be outside of both processors and other processors such as co-processor 1038, yet coupled to the processors via, for example, a PtP interconnect. This shared cache may be used to store the processors' local cache information (e.g., data requested by a processor), for example, if a processor is placed into a low power mode. This shared cache may include a last level cache, such as LLC 50, which was previously described herein at least with reference to FIG. 1. In addition, a shared cache controller, such as cache controller 60, may be coupled to the shared cache to control access to and from the shared cache.

Chipset 1090 may be coupled to a first bus 1010 via an interface circuit 1096. In an embodiment, first bus 1010 may be a Peripheral Component Interconnect (PCI) bus, or a bus such as a PCI Express bus or another third generation I/O interconnect bus, although the scope of the embodiments disclosed herein is not so limited. Various I/O devices 1016 may be coupled to first bus 1010, along with a bus bridge 1018, which couples first bus 1010 to a second bus 1020. In an embodiment, one or more additional processor(s) 1015, such as coprocessors, high-throughput MIC processors, GPGPU's, accelerators (e.g., graphics accelerators or digital signal processing (DSP) units), field programmable gate arrays, or any other processor, can be coupled to first bus 1010. In an embodiment, second bus 1020 may be a low pin count (LPC) bus. Second bus 1020 may be in communication with other devices such as a keyboard/mouse 1012 or other input devices (e.g., a touch screen, trackball, joystick, etc.), communication devices 1026 (e.g., modems, network interface devices, or other types of communication devices that may communicate through a computer network 1060), audio I/O devices 1014, and/or a storage unit 1028 (e.g., a disk drive or other mass storage device, which may include instructions/code and data 1030). In alternative embodiments, any portions of the bus architectures could be implemented with one or more PtP links.

In one example, code and data 1030 of storage unit 1028 may contain a software driver that can be run to exploit information from a software application that is causing read requests to be generated. The information may be related to LLC re-use of certain software buffers. As previously discussed herein, the dynamic fill policy may be invoked only for requests that the software marks as having a lesser chance of getting re-used from the LLC in order to maximize the benefits from LLC re-use as well as achieving peak system memory performance.

Other software may also be stored in code and data 1030 to enable configuration and control of DFP-related parameters. In one example, DFP-related parameters may be manually configured by a user, for example, via input devices (e.g., keyboard/mouse 1012) in conjunction with a user interface displayed on a display screen (e.g., display 1033). One example of DFP-related parameters includes a threshold used to determine whether to deallocate an entry in an LRB if the LRB is too full. Another parameter could be a hit-rate threshold that can be used to determine whether the dynamic fill policy is applicable to a data request from a particular processing device based on its actual hit rates during a run-time or averaged over one or more prior run-times. The software can allow DFP-related parameters, such as a threshold for determining whether to deallocate an LRB entry and/or a hit-rate threshold to be statically set or adaptively modified, for example, until a desired optimum run-time configuration is achieved.

The computing system depicted in FIG. 10 is a schematic illustration of an embodiment that may be utilized to implement various embodiments discussed herein. Note that other architectures are possible. For example, in alternative embodiments, any or all of the PtP links illustrated in FIG. 10 could be implemented as a multi-drop bus or other suitable architecture. It will be appreciated that various components of the system depicted in FIG. 10 may be combined in a system-on-a-chip (SOC) architecture or in any other suitable configuration capable of the dynamic fill policy features, according to the various embodiments provided herein.

Figure 11:
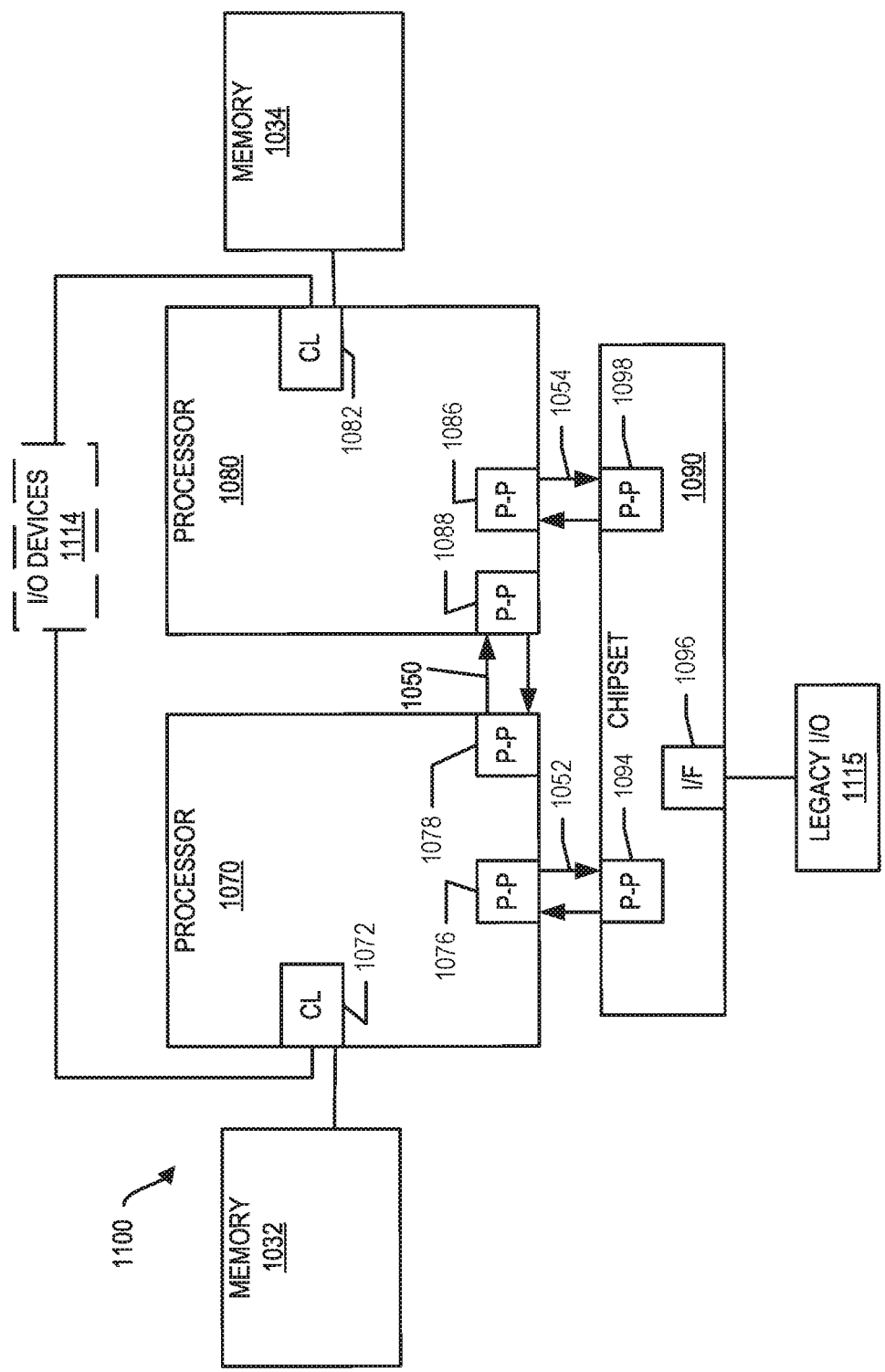

Referring now to FIG. 11, shown is a block diagram of a second more specific exemplary system 1100 in accordance with an embodiment of the present disclosure. Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1070, 1080 may include integrated memory and I/O control logic ("CL") 1072 and 1082, respectively. Thus, the CL 1072, 1082 include integrated memory controller units and include I/O control logic. FIG. 11 illustrates that not only are the memories 1032, 1034 coupled to the CL 1072, 1082, but also that I/O devices 1114 are also coupled to the control logic 1072, 1082. Legacy I/O devices 1115 are coupled to the chipset 1090.

Figure 12:
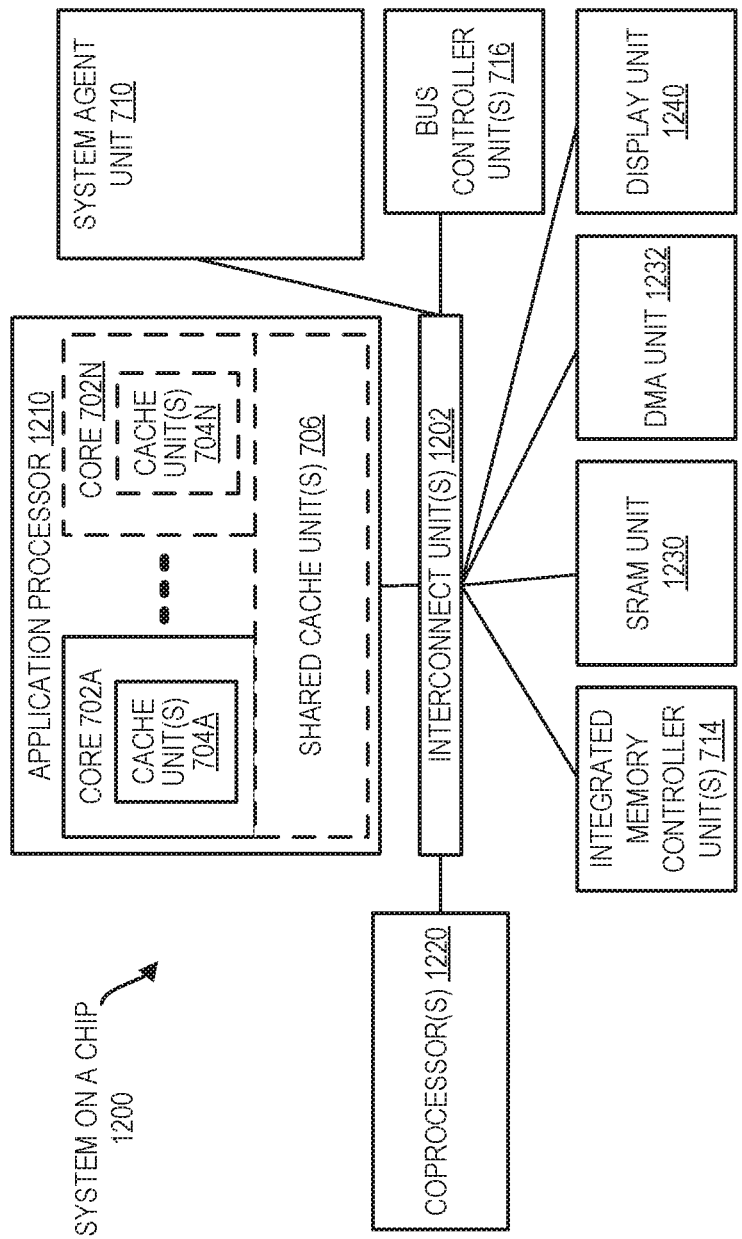

Referring now to FIG. 12, shown is a block diagram of an SoC 1200 in accordance with an embodiment of the present disclosure. Similar elements in FIG. 7 bear like reference numerals. Also, dashed lined boxes are optional features on more advanced SoCs. In FIG. 12, an interconnect unit(s) 1202 is coupled to: an application processor 1210 which includes a set of one or more cores 702A-N and shared cache unit(s) 706; a system agent unit 710; a bus controller unit(s) 716; an integrated memory controller unit(s) 714; a set or one or more coprocessors 1220 which may include integrated graphics logic, an image processor, an audio processor, and a video processor; a static random access memory (SRAM) unit 1230 (and/or dynamic random access memory (DRAM)); a direct memory access (DMA) unit 1232; and a display unit 1240 for coupling to one or more external displays. In one embodiment, the coprocessor(s) 1220 include a special-purpose processor, such as, for example, a network or communication processor, compression engine, GPGPU, a high-throughput MIC processor, embedded processor, or the like.

Embodiments of the dynamic cache filling mechanisms disclosed herein may be implemented in hardware, software, firmware, or a combination of such implementation approaches. Embodiments of the present disclosure related to the dynamic fill policy may be implemented as digital circuitry and/or as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the one or more of the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Figure 13:
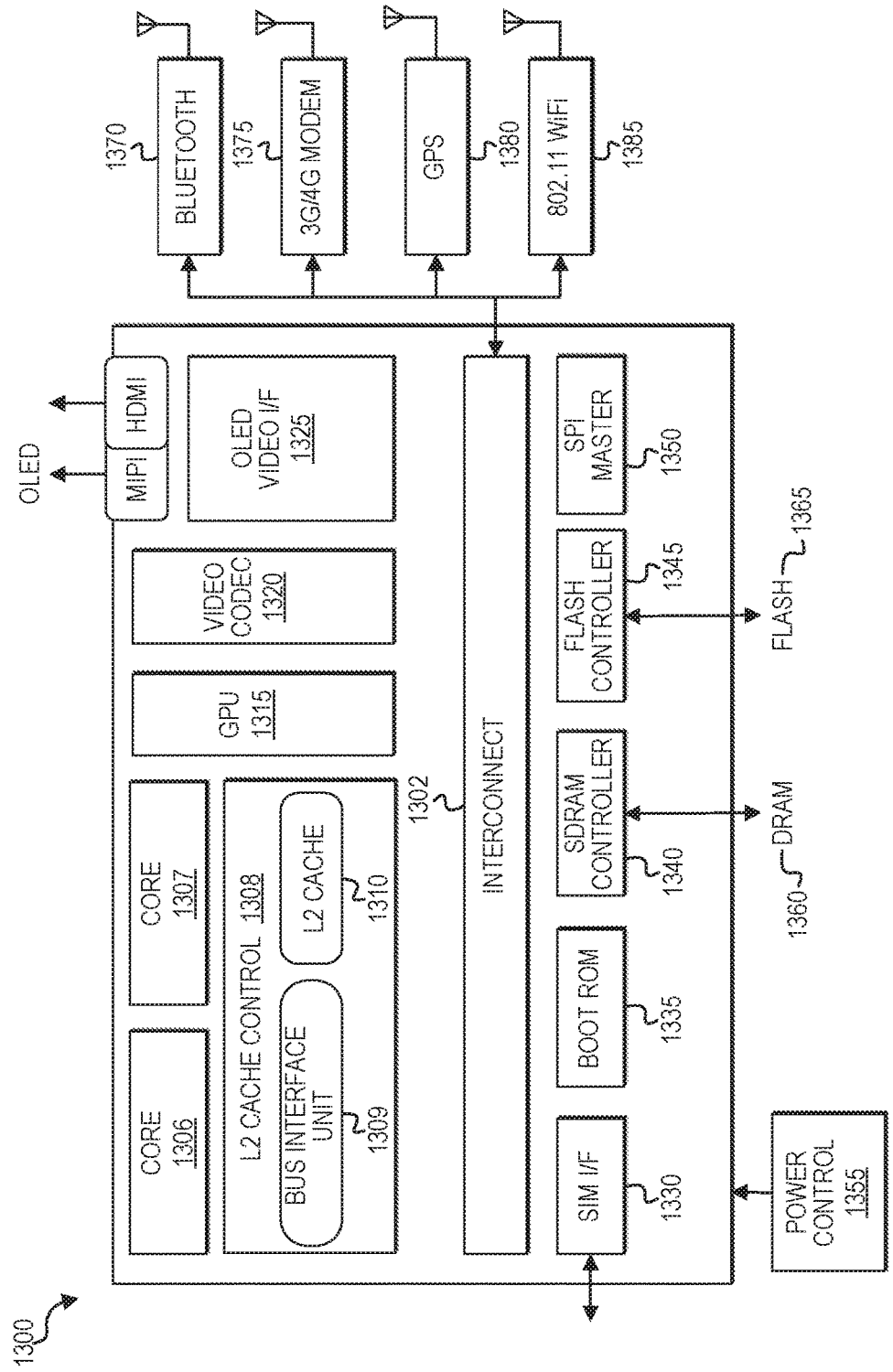

Turning to FIG. 13, FIG. 13 is a simplified block diagram associated with an example Advanced RISC Machine (ARM) ecosystem system-on-a-chip (SOC) 1300 of the present disclosure. At least one example implementation of the present disclosure can include the dynamic fill policy features discussed herein and an ARM component such as SOC 1300. For example, in at least some embodiments, cache controller 60, shared LLC 50, and LLC request buffer 55, as shown and described with reference to FIG. 1, could be implemented in SOC 1300 to enable dynamically filling the LLC with requests from GPU 1315 and cores 1306 and 1307 of SOC 1300, in accordance with embodiments disclosed herein. Further, the architecture of SOC 1300, which can include a dynamic fill policy, can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 13, SOC 1300 may include multiple cores 1306-1307, an L2 cache control 1308, a bus interface unit 1309, an L2 cache 1310, graphics processing unit (GPU) 1315, an interconnect 1302, a video codec 1320, and an organic light emitting diode (OLED) video I/F 1325, which may be associated with mobile industry processor interface (MIPI)/high-definition multimedia interface (HDMI) links that couple to an OLED display.

SOC 1300 may also include a subscriber identity module (SIM) I/F 1330, a boot read-only memory (ROM) 1335, a synchronous dynamic random access memory (SDRAM) controller 1340, a flash controller 1345, a serial peripheral interface (SPI) master 1350, a suitable power control 1355, a dynamic RAM (DRAM) 1360, and a flash memory 1365. In addition, one or more example embodiments include one or more communication capabilities, interfaces, and features such as instances of Bluetooth™ 1370, a 3G (or other nG or cellular technology) modem 1375, a global positioning system (GPS) 1380, and an 802.11 Wi-Fi 1385.

In operation, the example of FIG. 13 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache, and/or a shared last level cache with a shared cache controller for the LLC.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 14:
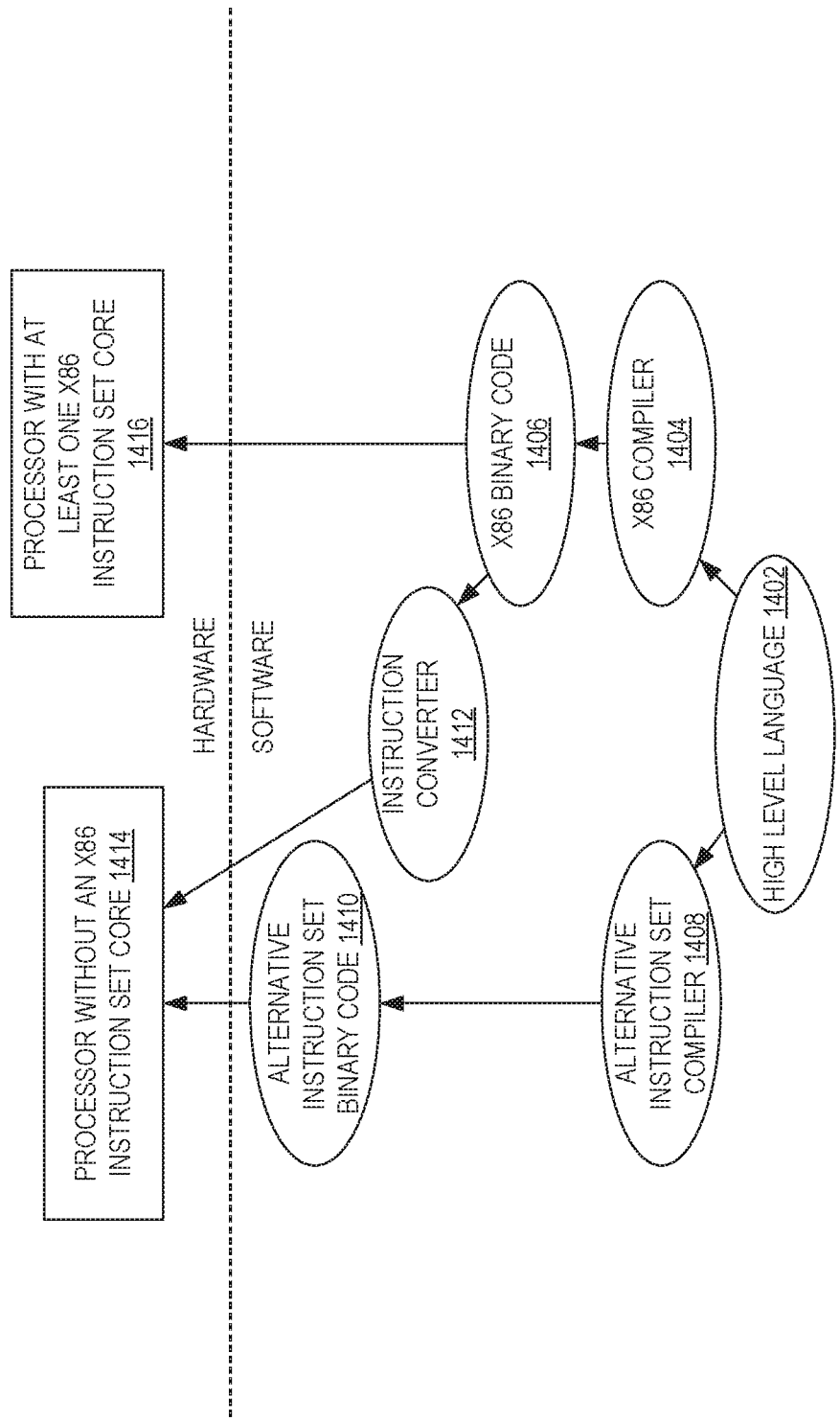
FIG. 14 is a block diagram contrasting the use of a software instruction converter to convert binary instructions in a source instruction set to binary instructions in a target instruction set according to embodiments of the present disclosure.

FIG. 14 is a block diagram contrasting the use of a software instruction converter to convert binary instructions in a source instruction set to binary instructions in a target instruction set according to embodiments of the present disclosure. In the illustrated embodiment, the instruction converter is a software instruction converter, although alternatively the instruction converter may be implemented in software, firmware, hardware, or various combinations thereof. FIG. 14 shows a program in a high-level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

Regarding possible structures associated with embodiments disclosed herein, diverse processors (e.g., CPUs, GPUs, FPGAs, APUs, DSPs, ASICs, etc.) are connected to a memory element (e.g., system memory 70), which represents one or more types of memory including volatile and/or nonvolatile memory elements for storing data and information, including instructions, logic, and/or code, to be accessed by the processor. Computing system 10 may keep data and information in any suitable memory element (e.g., static random access memory (SRAM), dynamic random access memory (DRAM), read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, an application specific integrated circuit (ASIC), or other types of nonvolatile machine-readable media that are capable of storing data and information), software, hardware, firmware, or in any other suitable component, device, element, or object where appropriate and based on particular needs. Any of the memory items discussed herein (e.g., processor side caches 25(1)-25(N) and 35(1)-35(M), last level cache 50, LLC request buffer 55, system memory 70) should be construed as being encompassed within the broad term 'memory element.'

In an example implementation, cache controller 60 includes logic to achieve (or to foster) the dynamic fill policy activities, as outlined herein. In some embodiments, at least some of these dynamic fill policy activities may be carried out by hardware (e.g., digital circuit), implemented externally to the cache controller, or included in some other component coupled to processing devices (e.g., CPUs, GPUs) and/or the cache controller to achieve the intended functionality. The cache controller may also include logic (or reciprocating logic) that can coordinate with other components in order to achieve the intended functionality, as outlined herein. In still other embodiments, one or several elements may include any suitable algorithms, hardware, firmware, software, components, modules, interfaces, or objects that facilitate the operations thereof. Logic may be suitably combined or partitioned in any appropriate manner, which may be based on particular configuration and/or provisioning needs.

The architectures presented herein are provided by way of example only, and are intended to be non-exclusive and non-limiting. Furthermore, the parts disclosed are intended to be logical divisions only (e.g., cache controller 60, LLC fill logic 62, dynamic fill logic 64), and may represent integrated hardware and/or software or physically separate hardware and/or software. Certain computing systems may include the cache controller as a separate chip or integrated into another chip, such as being placed on the same die or as an integral part of a processing device (e.g., CPU, GPU, APU, FPGA, DSP, ASIC, etc.). In yet other computing systems, the cache controller may be separately provisioned or combined with other cache controllers (e.g., other cache memory controllers, memory controllers, DRAM controllers, etc.).

It is also important to note that the operations in the preceding flowcharts and diagrams illustrating interactions (e.g., FIGS. 1-2), illustrate only some of the possible dynamic fill policy operations that may be executed by, or within, computing system 10. Some of these operations may be deleted or removed where appropriate, or these operations may be modified or changed considerably without departing from the scope of the present disclosure. In addition, the timing of these operations may be altered considerably. For example, the timing and/or sequence of certain operations may be changed relative to other operations to be performed before, after, or in parallel to the other operations, or based on any suitable combination thereof. By way of example, a determination that a dynamic fill policy is applicable to a read request from a particular processing device may be made before processing the read request. In this instance, separate flows may be performed based on whether the read request is received from the particular processing device. For example, a flow with dynamic fill policy logic may be invoked for all read requests from GPUs, while a flow without a dynamic fill policy logic may be invoked for all read requests from CPUs. In other scenarios, a determination of whether a dynamic fill policy is applicable to a read request from a particular processing device may be made at any suitable point within a flow (e.g., flow 200) that processes read requests from multiple diverse processing devices. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

As used herein, unless expressly stated to the contrary, use of the phrase 'at least one of' refers to any combination of the named elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z. Additionally, unless expressly stated to the contrary, the numbering adjectives 'first', 'second', 'third', etc., are intended to distinguish the particular terms (e.g., element, condition, module, activity, operation, claim element, etc.) they precede, but are not intended to indicate any type of order, rank, importance, temporal sequence, or hierarchy of the modified term. For example, 'first X' and 'second X' are intended to designate two separate X elements that are not necessarily limited by any order, rank, importance, temporal sequence, or hierarchy of the two elements. Also, references in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

The following examples pertain to embodiments in accordance with this specification.

Example S1 may include an system, comprising: a first processing device; a second processing device; a cache controller coupled to a cache shared by the first and second processing devices, the cache controller to determine that data requested in a first request for the data by the first processing device is not stored in the cache, where a dynamic fill policy is applicable to the first request, determine to deallocate, based at least in part on a threshold, an entry in a buffer, the entry containing information corresponding to the first request for the data, and send a second request for the data to a system memory; and a memory controller to send the data from the system memory to the first processing device.

In Example S2, the subject matter of Example S1 can optionally include that the data from the system memory is not written to the cache based, at least in part, on the determination to deallocate the entry.

In Example S3, the subject matter of any one of Examples S1-S2 can optionally include that, prior to sending the second request, the entry in the buffer is deallocated in response to determining to deallocate the entry.

In Example S4, the subject matter of any one of Examples S1-S3 can optionally include that the second request includes an indication that the data is to be sent directly to the first processing device from the system memory.

In Example S5, the subject matter of any one of Examples S1-S4 can optionally include that the cache controller is further to determine that the dynamic fill policy is applicable to the first request based on the first processing device, where the dynamic fill policy is not applicable to requests for data from the second processing device.

In Example S6, the subject matter of any one of Examples S1-S5 can optionally include that the first processing device is a graphics processing unit (GPU) and the second processing device has a higher hit rate in the cache for read requests than the first processing device.

In Example S7, the subject matter of any one of Examples S1-S6 can optionally include that the first request for the data is a read request.

In Example S8, the subject matter of Example S7 can optionally include that the cache controller is further to search for the data in the cache upon receiving the read request.

In Example S9, the subject matter of any one of Examples S1-S8 can optionally include that the threshold is one of a whole number or a percentage associated with filled entries contained in the buffer.

In Example S10, the subject matter of any one of Examples S1-S8 can optionally include that the threshold is one of a whole number or a percentage associated with free entries contained in the buffer.

In Example S11, the subject matter of any one of Examples S1-S10 can optionally include that the cache controller is further to, based on determining not to deallocate the entry, write the data from the system memory to the cache and deallocate the entry subsequent to writing the data to the cache.

In Example S12, the subject matter of any one of Examples S1-S11 can optionally include one or more memory elements including a set of instructions that when executed, are to cause at least one processing device of the system to either statically set the threshold or adaptively modify the threshold.

In Example S13, the subject matter of Example S12 can optionally include that the threshold is adaptively modified based, at least in part, on run-time information associated with sending the second request for the data to the system memory.

In Example S14, the subject matter of any one of Examples S1-S11 can optionally include one or more memory elements including a set of instructions that when executed, are to cause at least one processing device of the system to mark the first request to indicate the dynamic fill policy is applicable to the first request based on a probability of the data being re-used from the cache.

Example A1 may include an apparatus, comprising: a cache shared by at least a first processing device and a second processing device; a cache controller coupled to the cache to receive a first request for data from the first processing device, where a dynamic fill policy is applicable to the first request, determine that the data is not stored in the cache, determine to deallocate, based at least in part on a threshold, an entry in a buffer, the entry containing information corresponding to the first request for the data, and send a second request for the data to a system memory; and a memory controller to send the data from the system memory to the first processing device.

In Example A2, the subject matter of Example A1 can optionally include that the data from the system memory is not written to the cache based, at least in part, on the determination to deallocate the entry.

In Example A3, the subject matter of any one of Examples A1-A2 can optionally include that, prior to sending the second request, the entry in the buffer is deallocated in response to determining to deallocate the entry.

In Example A4, the subject matter of any one of Examples A1-A3 can optionally include that the second request includes an indication that the data is to be sent directly to the first processing device from the system memory.

In Example A5, the subject matter of any one of Examples A1-A4 can optionally include that the cache controller is further to determine that the dynamic fill policy is applicable to first request based on the first processing device, where the dynamic fill policy is not applicable to requests for data from the second processing device.

In Example A6, the subject matter of any one of Examples A1-A5 can optionally include that the first processing device is a graphics processing unit (GPU) and the second processing device has a higher hit rate in the cache for read requests than the first processing device.

In Example A7, the subject matter of any one of Examples A1-A6 can optionally include that the first request for the data is a read request.

In Example A8, the subject matter of Example A7 can optionally include that the cache controller is further to search for the data in the cache upon receiving the read request.

In Example A9, the subject matter of any one of Examples A1-A8 can optionally include that the threshold is one of a whole number or a percentage associated with filled entries contained in the buffer.

In Example A10, the subject matter of any one of Examples A1-A8 can optionally include that the threshold is one of a whole number or a percentage associated with free entries contained in the buffer.

In Example A11, the subject matter of any one of Examples A1-A10 can optionally include that the cache controller is further to, based on determining not to deallocate the entry, write the data from the system memory to the cache and deallocate the entry subsequent to writing the data to the cache.

In Example A12, the subject matter of any one of Examples A1-A11 can optionally include one or more memory elements including a set of instructions that when executed, are to cause at least one processing device of the apparatus to either statically set the threshold or adaptively modify the threshold.

In Example A13, the subject matter of Example A12 can optionally include that the threshold is adaptively modified based, at least in part, on run-time information associated with sending the second request for the data to the system memory.

In Example A14, the subject matter of any one of Examples A1-A11 can optionally include one or more memory elements including a set of instructions that when executed, are to cause at least one processing device of the apparatus to mark the first request to indicate the dynamic fill policy is applicable to the first request based on a probability of the data being re-used from the cache.

The following examples pertain to embodiments in accordance with this specification. Example M1 provides an a method, at least one machine-readable storage medium including instructions, and/or hardware-, firmware-, and/or software-based logic, where the Example of M1 comprises determining that data requested in a first request for the data by a first processing device is not stored in a cache shared by the first processing device and a second processing device, where a dynamic fill policy is applicable to the first request, determining to deallocate, based at least in part on a threshold, an entry in a buffer, the entry containing information corresponding to the first request for the data, sending a second request for the data to a system memory; and sending the data from the system memory to the first processing device.

In Example M2, the subject matter of Example M1 can optionally include that the data from the system memory is not written to the cache based, at least in part, on the determination to deallocate the entry.

In Example M3, the subject matter of any one of Examples M1-M2 can optionally include, prior to sending the second request, deallocating the entry in the buffer in response to determining to deallocate the entry.

In Example M4, the subject matter of any one of Examples M1-M3 can optionally include that the second request includes an indication that the data is to be sent directly to the first processing device from the system memory.

In Example M5, the subject matter of any one of Examples M1-M4 can optionally include determining that the dynamic fill policy is applicable to the first request based, at least in part, on a hit rate of the first processing device according to a hit-rate threshold.

In Example M6, the subject matter of any one of Examples M1-M5 can optionally include that the first processing device is a graphics processing unit (GPU) and the second processing device has a higher hit rate in the cache for read requests than the first processing device.

In Example M7, the subject matter of any one of Examples M1-M6 can optionally include that the first request for the data is a read request.

In Example M8, the subject matter of Example M7 can optionally include searching for the data in the cache upon receiving the read request.

In Example M9, the subject matter of any one of Examples M1-M8 can optionally include that the threshold is one of a whole number or a percentage associated with filled entries contained in the buffer.

In Example M10, the subject matter of any one of Examples M1-M8 can optionally include that the threshold is one of a whole number or a percentage associated with free entries contained in the buffer.

In Example M11, the subject matter of any one of Examples M1-M10 can optionally include, based on determining not to deallocate the entry, writing the data from the system memory to the cache and deallocating the entry subsequent to writing the data to the cache.

In Example M12, the subject matter of any one of Examples M1-M11 can optionally include statically setting the threshold or adaptively modifying the threshold.

In Example M13, the subject matter of Example M12 can optionally include that the threshold is adaptively modified based, at least in part, on run-time information associated with sending the second request for the data to the system memory.

In Example M14, the subject matter of any one of Examples M1-M13 optionally includes marking the first request to indicate the dynamic fill policy is applicable to the first request based on a probability of the data being re-used from the cache.

Example Y1 provides an apparatus for dynamically filling a cache, where the apparatus comprises means for performing the method of any one of Examples M1-M14.

In Example Y2, the subject matter of Example Y1 can optionally include that the means for performing the method comprise at least one digital circuit.

In Example Y3, the subject matter of any one of Examples Y1-Y2 can optionally include that the means for performing the method comprise a memory element, the memory element comprising machine readable instructions that when executed, cause, at least in part, the apparatus to perform the method of any one of Examples M1-M14.

In Example Y4, the subject matter of any one of Examples Y1-Y3 can optionally include that the apparatus is one of a computing system or a system-on-a-chip.

Example Y5 provides at least one machine readable storage medium comprising instructions for dynamically filling a cache, where the instructions when executed realize an apparatus, realize a system, or implement a method as in any one of the preceding Examples.

What is claimed is:

1. An apparatus, the apparatus comprising:
    a cache shared by at least a first processing device and a second processing device;
    a cache controller coupled to the cache, the cache controller to:
        receive a first request for data from the first processing device;
        determine that the data is not stored in the cache;
        determine whether a dynamic fill policy is to be applied to the first request for the data based, at least in part, on which processing device sent the first request for the data, wherein applying the dynamic fill policy to the first request for the data is to:
            determine whether to deallocate an entry in a buffer based on a threshold related to the buffer, the entry containing information indicating the first request for the data; and
            send a second request for the data to a system memory; and
    a memory controller to send the data from the system memory to the first processing device.

2. The apparatus of claim 1, wherein the data from the system memory is not written to the cache based, at least in part, on a determination to deallocate the entry.

3. The apparatus of claim 1, wherein, prior to sending the second request, the entry in the buffer is deallocated in response to a determination to deallocate the entry.

4. The apparatus of claim 1, wherein, based on a determination to deallocate the entry, the second request includes an indication that the data requested in the second request for the data is to be sent directly to the first processing device from the system memory.

5. The apparatus of claim 1, wherein the cache controller is further to:
    determine that the dynamic fill policy is to be applied to requests for data from at least one processing device of a plurality of processing devices in the apparatus; and
    determine that the dynamic fill policy is not to be applied to requests for data from at least one other processing device of the plurality of processing devices in the apparatus.

6. The apparatus of claim 5, wherein the at least one processing device has a higher hit rate in the cache for read requests than the at least one other processing device.

7. The apparatus of claim 1, wherein the first request for the data is a read request.

8. The apparatus of claim 7, wherein the cache controller is further to:
    search for the data in the cache upon receiving the read request.

9. The apparatus of claim 1, wherein the threshold is one of a whole number or a percentage associated with filled entries contained in the buffer.

10. The apparatus of claim 1, wherein the threshold is one of a whole number or a percentage associated with free entries contained in the buffer.

11. The apparatus of claim 1, wherein the cache controller is further to, based on a determination not to deallocate the entry:
    write the data from the system memory to the cache; and
    deallocate the entry subsequent to writing the data to the cache.

12. The apparatus of claim 1, further comprising:
    one or more memory elements including a set of instructions that when executed, are to cause at least one processing device of the apparatus to either statically set the threshold or adaptively modify the threshold.

13. The apparatus of claim 12, wherein the threshold is adaptively modified based, at least in part, on run-time information associated with sending the second request for the data to the system memory.

14. The apparatus of claim 1, further comprising:
    one or more memory elements including a set of instructions that when executed, are to cause at least one processing device of the apparatus to:
        mark the first request for the data to indicate the dynamic fill policy is to be applied to the first request for the data based on a probability of the data being re-used from the cache.

15. A system, the system comprising:
    a first processing device;
    a second processing device;
    a cache controller coupled to a cache shared by the first and second processing devices, the cache controller to:
        determine that data requested in a first request for the data by the first processing device is not stored in the cache;
        determine whether a dynamic fill policy is to be applied to the first request for the data based, at least in part, on which processing device sent the first request for the data, wherein applying the dynamic fill policy to the first request for the data is to:
            determine whether to deallocate an entry in a buffer based on a threshold related to the buffer, the entry containing information indicating the first request for the data; and
            send a second request for the data to a system memory; and
    a memory controller to send the data from the system memory to the first processing device.

16. The system of claim 15, wherein the data from the system memory is not written to the cache based, at least in part, on a determination to deallocate the entry.

17. The system of claim 15, wherein, prior to sending the second request, the entry in the buffer is deallocated in response to a determination to deallocate the entry.

18. The system of claim 15, wherein the cache controller is further to:
determine that the dynamic fill policy is to be applied to requests for data from at least one processing device of a plurality of processing devices in the apparatus; and
determine that the dynamic fill policy is not to be applied to requests for data from at least one other processing device of the plurality of processing devices in the apparatus.

19. The system of claim 15, wherein the cache controller is further to:
search for the data in the cache upon receiving the first request.

20. The system of claim 15, wherein the threshold is associated with either filled entries or free entries contained in the buffer.

21. The system of claim 15, further comprising:
one or more memory elements including a set of instructions that when executed, are to cause at least one processing device of the apparatus to either statically set the threshold or adaptively modify the threshold.

22. A method, the method comprising:
determining that data requested in a first request for the data by a first processing device is not stored in a cache shared by the first processing device and a second processing device;
determining whether a dynamic fill policy is to be applied to the first request for the data based, at least in part, on which processing device sent the first request for the data, wherein applying the dynamic fill policy to the first request for the data includes:
determining whether to deallocate an entry in a buffer based on a threshold related to the buffer, the entry containing information indicating the first request for the data; and
sending a second request for the data to a system memory; and
sending the data from the system memory to the first processing device.

23. The method of claim 22, wherein the data from the system memory is not written to the cache based, at least in part, on a determination to deallocate the entry.

24. The method of claim 22, wherein, based on a determination to deallocate the entry, the second request includes an indication that the data is to be sent directly to the first processing device from the system memory.

25. The method of claim 22, further comprising:
determining that the dynamic fill policy is to be applied to the first request based, at least in part, on a hit rate of the first processing device according to a hit-rate threshold.

* * * * *